(12) United States Patent
Kasul et al.

(10) Patent No.: US 11,514,432 B2
(45) Date of Patent: Nov. 29, 2022

(54) METHODS AND SYSTEMS FOR INTEGRATING A LOYALTY PROGRAM WITH A PAYMENT CARD

(71) Applicant: MASTERCARD INTERNATIONAL INCORPORATED, Purchase, NY (US)

(72) Inventors: Vijay Kasul, Telemgana (IN); Rajeev Kumar, Benares (IN); Gokul Vyas, Nagpur (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 205 days.

(21) Appl. No.: 16/543,843

(22) Filed: Aug. 19, 2019

(65) Prior Publication Data

US 2019/0370786 A1 Dec. 5, 2019

Related U.S. Application Data

(63) Continuation-in-part of application No. 16/390,400, filed on Apr. 22, 2019, now Pat. No. 11,347,877.

(30) Foreign Application Priority Data

May 2, 2018 (SG) .............................. 10201803690T

(51) Int. Cl.
*G06Q 20/34* (2012.01)
*G06Q 30/02* (2012.01)
(Continued)

(52) U.S. Cl.
CPC ......... *G06Q 20/3574* (2013.01); *G06Q 20/20* (2013.01); *G06Q 20/341* (2013.01);
(Continued)

(58) Field of Classification Search
CPC ........... G06Q 20/3574; G06Q 30/0233; G06Q 20/341; G06Q 20/354; G06Q 20/409;
(Continued)

(56) References Cited

U.S. PATENT DOCUMENTS 6,549,912 B1* 4/2003 Chen .................... G06Q 20/105
6,920,611 B1* 7/2005 Spaeth ................... G06Q 20/10
705/14.27

(Continued)

*Primary Examiner* — Sonji N Johnson
(74) *Attorney, Agent, or Firm* — Buckley, Maschoff & Talwalker LLC

(57) ABSTRACT

Embodiments provide a method of integrating a loyalty program with a payment card of a customer. In some implementations, the method includes sending, by a merchant terminal, a payment transaction request to a server system associated with a payment network. The payment transaction request includes a payment transaction amount to be paid to a merchant account from an issuer account of the customer and a consumer identifier linked to the loyalty program associated with the merchant loyalty card. The method includes receiving a notification comprising a payment transaction approval message and a machine-readable script through the payment network. The machine-readable script comprises the consumer identifier and is executable by the merchant terminal. The method further includes storing the consumer identifier associated with the merchant loyalty card with existing customer data in the payment card of the customer by executing the machine-readable script thereby integrating the loyalty program with the payment card.

16 Claims, 15 Drawing Sheets

(51) Int. Cl.
*G06Q 20/20* (2012.01)
*G06Q 20/40* (2012.01)

(52) U.S. Cl.
CPC ......... *G06Q 20/354* (2013.01); *G06Q 20/409* (2013.01); *G06Q 30/0233* (2013.01); *G06Q 30/0238* (2013.01)

(58) Field of Classification Search
CPC .. G06Q 30/0238; G06Q 20/20; G06Q 20/206; G06Q 20/4093; G06Q 20/405; G06Q 20/387
See application file for complete search history.

(56) References Cited

U.S. PATENT DOCUMENTS

| | | | | |
|---|---|---|---|---|
| 8,781,891 B2 * | 7/2014 | Postrel | ................ | H04L 67/306 705/14.1 |
| 2002/0065712 A1 * | 5/2002 | Kawan | ................ | G06Q 30/02 705/14.25 |
| 2004/0054591 A1 * | 3/2004 | Spaeth | ................ | G06Q 30/02 705/14.27 |
| 2010/0004992 A1 * | 1/2010 | Tietzen | ................ | G06Q 30/02 705/30 |
| 2012/0253914 A1 * | 10/2012 | Black | ................ | G06Q 30/02 705/14.28 |

* cited by examiner

| MERCHANT IDENTIFIER (MID) ←602 | CONSUMER MOBILE NUMBER ←604 | RULES ←606 | VALIDITY OF LOYALTY PAINTS/LOYALTY PROGRAM ←608 | PAYMENT CARD NUMBERS ←610 | REDEEMABLE LOYALTY POINTS AGAINST PAYMENT CARDS ←612 |
|---|---|---|---|---|---|
| MC11 | 777-123-4567 | RULE 01: FOR A TRANSACTION OF EVERY INR 10 AWARD 1 LOYALTY POINT<br>RULE 02: ONLY 50% OF TOTAL POINTS REDEEMABLE TILL 1ST YEAR OF MEMBERSHIP AND 100% OF TOTAL POINTS REDEEMABLE FROM 2ND YEAR OF MEMBERSHIP<br>RULE 03: 10 LOYALTY POINTS AMOUNTS TO INR 1 | MARCH 31, 2019 | 5122XXXXXXXXXXXX | 1214 |
| | | | | 4210XXXXXXXXXXXX | 132 |
| | | | | 7816XXXXXXXXXXXX | 524 |
| | | | | 2123XXXXXXXXXXXX | 68 |
| | | | | 1020XXXXXXXXXXXX | 13 |
| | | | | 7121XXXXXXXXXXXX | 07 |
| ....... | ....... | ....... | ....... | ....... | ....... |

METHODS AND SYSTEMS FOR INTEGRATING A LOYALTY PROGRAM WITH A PAYMENT CARD

CROSS-REFERENCE TO RELATED APPLICATION

This application is a continuation-in-part of co-pending U.S. patent application Ser. No. 16/390,400 filed on Apr. 22, 2019, which is a U.S. National Stage filing under 35 U.S.C. § 119, based on and claiming benefits of and priority to Singapore Patent Application No. 10201803690T filed on May 2, 2018. The entire disclosures of the above applications are incorporated herein by reference for all purposes.

TECHNICAL FIELD

The present disclosure relates to payment transactions and, more particularly to, methods and systems for rewarding loyalty points to customers for payment transactions.

BACKGROUND

Over the last few years, retail establishments and merchants have recognized the value of customer loyalty. Retailers and merchants offer customers memberships in loyalty programs to strengthen customer loyalty. When customers enroll for membership, their purchases and use of services are rewarded accordingly with what is known as loyalty points. These loyalty points can be redeemed with the merchant offering the membership or any partner merchants during payment transactions. In some instances, merchants issue loyalty cards to customers to identify the customer. To enjoy loyalty benefits (such as accumulation of points or redemption of accumulated points) customers present their cards at the merchant terminals during checkout.

Loyalty cards and rewards programs, however, are associated with operational setback. Generally, business, merchant, restaurant, store, etc., have their respective loyalty cards that they provide to their customers. Customers may find it unwieldy and impractical to carry and keep track of multiple loyalty cards. They may often forget to carry a specific loyalty/rewards card that they may require to present to a POS terminal. As such, retailers have difficult time convincing customers to join their programs thereby losing out on potential existing customers or even prospective new customers.

In some instances, merchants can also identify customers registered as members with their contact information. The customers may have provided their contact information while enrolling for the membership. To enjoy loyalty benefits, customers provide their contact numbers at merchant terminals during checkout. This partially terminates the need of having to carry loyalty cards by the customers. However, many customers may not provide their contact information to merchants while filling out membership forms fearing risk of the contact information landing in the hands of unauthorized sources. Moreover, some merchants may not even provide the facility of presenting contact information at merchant terminals during checkout without producing the loyalty card.

In many instances, loyalty points have expiry dates, i.e. if a customer does not redeem loyalty points before the expiry date, the customer will not be entitled to any benefits, such as discount or any other offers. In an example scenario, loyalty points worth Indian Rupees (INR) 1000 may have accumulated in a customer's loyalty card for multiple payment transactions that the customer may have performed with a merchant 'A' over a year. The validity of the loyalty points may be expiring in a week. The customer, on the other hand, is unaware that loyalty points worth INR 1000 have accumulated in the card and it will be expired in a week's time. Hence, the customer loses valuable points, which he could have used in a payment transaction with the merchant before the date of expiry.

Moreover, some loyalty and/or rewards card programs exist that allow adding the loyalty card details to the POS software by an administrator who can manually enter or scan a loyalty card of customers during purchase, which is time consuming and impractical. Furthermore, each POS system may have a specific application programming interface (API) associated with it. Therefore, adding a loyalty/rewards card program with each POS system in multiple locations can be expensive, impractical and problematic.

Accordingly, there is a need to facilitate a technique for customers to avail loyalty benefits for their purchases and use of services without having to carry multiple physical loyalty cards with them.

SUMMARY

Various embodiments of the present disclosure provide systems, methods, electronic devices and computer program products for integrating a loyalty program associated with a merchant loyalty card of a customer (or consumer) with a payment card of the customer. Various embodiments of the present disclosure provide systems and methods for storing a consumer identifier linked to the loyalty program in a chip of the payment card of the customer.

An embodiment provides a method for integrating a loyalty program with a payment card. The method includes sending, by a merchant terminal, a payment transaction request to a server system associated with a payment network. The payment transaction request comprises a payment transaction amount to be paid to a merchant account from an issuer account of the customer and a consumer identifier linked to the loyalty program associated with the merchant loyalty card. The method includes receiving, by the merchant terminal, a notification comprising a payment transaction approval message and a machine-readable script through the payment network. The machine-readable script comprises at least the consumer identifier and is executable by the merchant terminal. The method further includes storing the consumer identifier associated with the merchant loyalty card with existing customer data in the payment card of the customer by executing the machine-readable script thereby integrating the loyalty program with the payment card.

Another embodiment provides a merchant terminal for integrating a loyalty program with a payment card. The merchant terminal includes a memory having stored executable instructions and at least one processor, configured to execute the stored instructions to cause the merchant terminal to perform sending a payment transaction request to a server system associated with a payment network. The payment transaction request comprises a payment transaction amount to be paid to a merchant account from an issuer account of the customer and a consumer identifier linked to the loyalty program associated with the merchant loyalty card. The merchant terminal is further caused to receive a notification comprising a payment transaction approval message and a machine-readable script through the payment network, wherein the machine-readable script comprises the consumer identifier and is executable by the at least one processor. The merchant terminal is also caused to store the consumer identifier associated with the merchant loyalty card with existing customer data in the payment card of the customer by executing the machine-readable script thereby integrating the loyalty program with the payment card.

Another embodiment provides a method for integrating a loyalty program with a payment card. The method includes receiving, by an issuer server, a payment transaction request associated with a payment network. The payment transaction request comprises a payment transaction amount to be paid to a merchant account from an issuer account of the customer and a consumer identifier linked to the loyalty program associated with the merchant loyalty card. The method includes generating, by the issuer server, a machine-readable script comprising the consumer identifier, wherein the machine-readable script is executable at the merchant terminal. The method further includes sending, by the issuer server, a notification comprising a payment transaction approval message and the machine-readable script through the payment network. The merchant terminal is configured to store the consumer identifier associated with the merchant loyalty card with existing customer data in the payment card of the customer by executing the machine-readable script.

BRIEF DESCRIPTION OF THE FIGURES

For a more complete understanding of example embodiments of the present technology, reference is now made to the following descriptions taken in connection with the accompanying drawings in which:

FIG. 6 is a simplified representation of a merchant database storing information corresponding to loyalty programs offered by a merchant;

Figure 1:
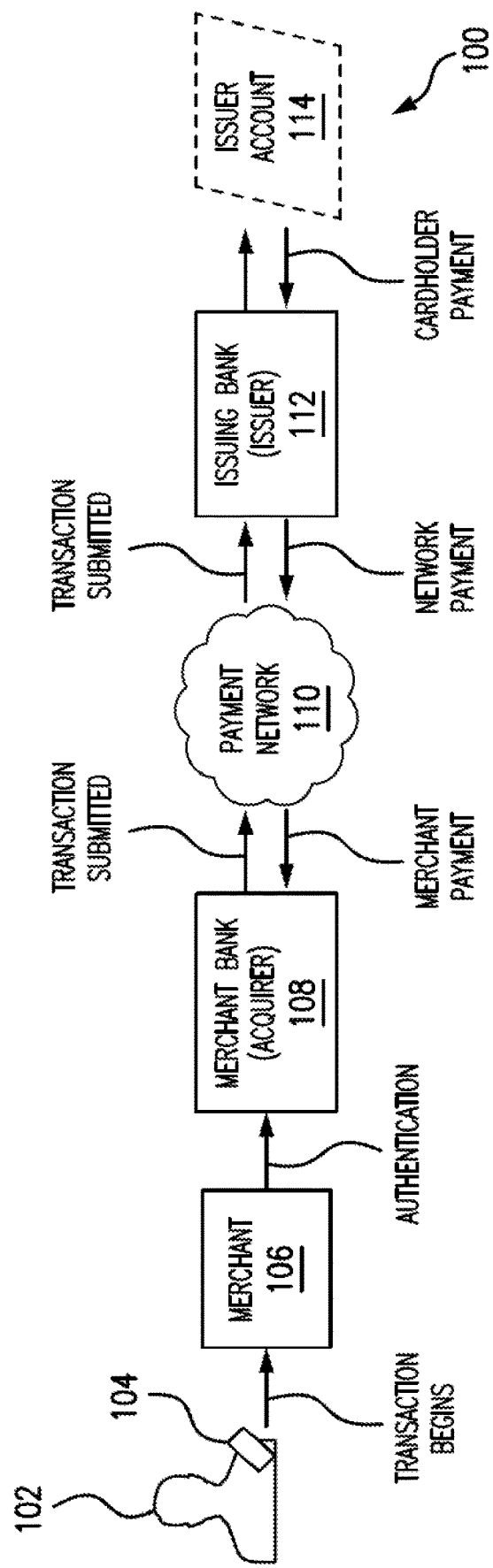
FIG. 1 is a schematic diagram illustrating an exemplary multi-party payment card system for enabling payment-by-card transactions in which merchants and card issuers do not necessarily have a one-to-one relationship.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer account" used throughout the description refers to a financial account that is used to fund the financial transaction (interchangeably referred to as "payment transaction"). Further, the "acquirer account" used throughout the description refers to a financial account of a merchant or any entity which receives the fund from the issuer account. Examples of the issuer account and the acquirer account include, but are not limited to a savings account, a credit account, a checking account and a virtual payment account.

Each of the issuer account and the acquirer account may be associated with an entity such as an individual person, a customer or consumer, a family, a commercial entity, a company, a corporation, a governmental entity, a non-profit organization and the like. In some scenarios, an issuer or acquirer account may be a virtual or temporary payment account that can be mapped or linked to a primary payment account, such as those accounts managed by PayPal®, and the like.

The term "payment card", used throughout the description, refer to a physical or virtual card linked with a financial or payment account that may be presented to a merchant or any such facility in order to fund a financial transaction via the associated payment account. Examples of the payment card include, but are not limited to, debit cards, credit cards, prepaid cards, virtual payment numbers, virtual card numbers, forex card, charge cards and stored-value cards. A payment card may be a physical card that may be presented to the merchant for funding the payment by a consumer or customer. Alternatively or additionally, the payment card may be embodied in form of data stored in a user device or consumer device or customer device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Overview

Various example embodiments of the present disclosure provide methods, systems, user devices and computer program products for integrating or linking a loyalty program with a payment card of a customer during a payment transaction performed at a merchant terminal. The merchant terminal is configured with a processor capable of executing a machine-readable script for storing a consumer identifier of the loyalty program in a chip of the payment card thereby integrating the loyalty program with the payment card. The consumer identifier may include, for example, a consumer identifier (such as a consumer mobile telephone number), a consumer e-mail address, or any other identifier of the consumer.

In various example embodiments, the present disclosure provides merchant terminals/POS terminals that can facilitate payment transactions using payment cards, and more particularly, payment cards equipped with ICs (electronic chips), at a merchant facility. In some embodiments, a server system is configured to receive a payment transaction request from a merchant terminal installed at a merchant facility where the customer has purchased products. The payment transaction request includes a transaction amount to be paid to a merchant account from an issuer account of a customer, a consumer identifier, such as a consumer telephone number, and a merchant identifier. The consumer identifier may be, for example, a mobile device telephone number, and it is linked to a loyalty program offered to the customer in the form of a loyalty card by the merchant or by an agency/partner with which the merchant is associated. The merchant identifier identifies the merchant offering the loyalty card. The server system may be an example of an issuer server associated with an issuer bank of the customer. When the customer dips/inserts the chip enabled payment card at the merchant terminal, the merchant terminal sends the payment transaction request to the server system. The server system generates a machine-readable script to encode the consumer identifier and the merchant identifier. The machine-readable script is then sent to the merchant terminal where the script is executed for storing the consumer identifier and the merchant identifier in the chip of the payment card thereby integrating the loyalty program with the payment card. In some embodiments, the machine-readable script is an example of an EMV PUT script that allows writing of information onto the chip of the customer's payment card. In embodiments disclosed herein, the merchant terminal facilitates awarding of loyalty points as the customer makes transactions with the merchant or any partner merchants, once the loyalty program is integrated with the customer's payment card.

While in use, the merchant terminal can scan the payment card of a registered customer to detect a consumer identifier stored in the payment card. The merchant terminal is configured with a script (e.g., EMV GET script) that allows reading of information from the chip of the payment card. Information corresponding to the loyalty program, i.e. the consumer identifier stored in the payment card is read by the merchant terminal. Upon finding the consumer identifier stored in the payment card, the merchant terminal awards/adds loyalty points for the current transaction to the customer's payment card. The loyalty points are awarded when future transactions are made using the payment card with the merchant and/or one or more partner merchants. In some implementations, the merchant terminal may also facilitate redemption of the loyalty points, so awarded, in subsequent transactions when the customer again uses the payment card with the merchant. The merchant terminal may further facilitate deactivation of an obsolete loyalty program, for example, by executing a deactivation script generated and sent by the server system. Similarly, the merchant terminal may facilitate modification of an existing loyalty program by executing a modification script generated and sent by the server system. Information corresponding to integration of loyalty program, rules for awarding of loyalty points, available loyalty points, rules for redemption of loyalty points, validity of loyalty program/loyalty points, deactivation and modification of loyalty program, etc., may also be stored in a merchant database.

FIG. 1 represents a typical payment transaction that is normally performed using payment cards, and various example embodiments of present invention are described hereinafter with reference to FIGS. 2 to 16.

Referring to FIG. 1, a schematic diagram illustrating an exemplary multi-party payment system 100 for enabling payment-by-card transactions in which merchants and payment card issuers do not necessarily have a one-to-one relationship. The payment system 100 may be a credit card payment system or a debit card payment system. In such a system, the credit/debit card uses a payment card interchange network 110, such as, a payment network 110. Examples of the payment card interchange network 110 include, but are not limited to, MasterCard® payment system interchange network 110. The MasterCard® payment system interchange network 110 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.). The payment card interchange network 110 is hereinafter referred to as the payment network 110.

In the payment system 100, a financial institution normally called as an "issuer bank" or "issuing bank" or simply "issuer" (see, 112), in which a user/customer 102 may have an issuer account (see 114), issues a payment card 104, such as a credit card or a debit card, to the customer 102. The payment card 104 is linked to the customer's issuer account 114. The customer 102 is the cardholder, who uses the payment card 104 to tender payment for a purchase from a facility of a merchant 106. To accept payment with the payment card 104, the merchant 106 must normally establish a merchant account with a financial institution that is part of the financial payment system. This financial institution is usually called a "merchant bank" or an "acquiring bank" or an "acquirer bank" or simply an "acquirer" 108. When the customer 102 tenders payment for a purchase with the payment card 104 (also known as a financial transaction card), the merchant 106 requests authorization from the acquirer 108 for the amount of the purchase. The request may be performed over the telephone, but is usually performed through the use of a merchant terminal or a point-of-sale (POS) terminal (shown in FIG. 2), which reads the customer's account information from a chip provided on some payment account cards or from a magnetic stripe provided in some other cards. The customer's account information is communicated electronically to the transaction processing computers of the acquirer 108. Alternatively, the acquirer 108 may authorize a third party to perform transaction processing on its behalf. In this case, the POS terminal will be configured to communicate with the third party. Such a third party is usually called a "merchant processor" or an "acquiring processor."

Using the payment network 110, the computers of the acquirer 108 or the merchant processor will communicate with the computers of the issuer 112 to determine whether the customer's account 114 is in good standing and whether the purchase is covered by the customer's available credit line or account balance. Based on these determinations, the request for authorization will be declined or accepted. If the request is accepted, an authorization code is issued to the merchant 106.

When a request for authorization is accepted, the available credit line or available balance of the customer's account 114 is decreased. Normally, a charge is not posted immediately to a customer's account because bankcard associations, such as MasterCard International Incorporated®, have promulgated rules that do not allow the merchant 106 to charge, or "capture," a transaction until goods are shipped or services are delivered. When the merchant 106 ships or delivers the goods or services, the merchant 106 captures the transaction by, for example, appropriate data entry procedures on the point-of-sale terminal. If the customer 102 cancels a transaction before it is captured, a "void" is generated. If the customer 102 returns goods after the transaction has been captured, a "credit" is generated.

For debit card transactions, a request for a PIN authorization has to be approved by the issuer 112. Upon approval by the issuer 112, the customer's account (i.e., the issuer account 114) is decreased. Normally, a charge is posted immediately to the customer's account 114. The bankcard association then transmits the approval to the acquiring processor for distribution of goods/services, or information or cash in the case of an ATM.

After a transaction is captured, the transaction is settled between the acquirer 108, and the issuer 112. Settlement refers to the transfer of financial data or funds between the merchant account, the acquirer 108, and the issuer 112, related to the transaction. Usually, transactions are captured and accumulated into a "batch", which is settled as a group.

Financial transaction cards or payment cards refer to cards used as a method for payment for performing transactions. As described herein, the term "financial transaction card" or "payment card" includes cards such as, but not limited to, credit cards, debit cards, prepaid cards and loyalty/rewards cards. Devices that may hold issuer account information, such as mobile phones (i.e., smartphones, cell phones, flip phones, and the like), personal digital assistants (PDAs), tablet computers, and key fobs may fall within the scope of the terms "Financial transaction cards" or "payment cards" or "customer payment cards." Financial transaction cards or payment cards or customer payment cards are hereinafter referred to as "payment cards". The transactions performed using the payment cards are referred to as "payment card transactions", "financial transactions" or simply "payment transactions." An example of a financial transaction may include making payment using the payment card at a merchant site using POS terminals.

In various example scenarios, payment transactions are facilitated with the use of loyalty cards or rewards cards. Merchants such as the merchant 106 (or any partner agency of the merchant 106) often offer loyalty membership to their prospective and existing customers such as the customer 102. Customers, who are registered as members of a loyalty program offered by merchants, are often provided with loyalty cards or rewards cards (shown in FIG. 2). The loyalty cards offer benefits such as loyalty points that can be used instead of currency or can be clubbed or combined with currency during a payment transaction. These loyalty points accumulate in the loyalty cards or loyalty card accounts of the customer 102, and accumulate when the customer 102 makes transactions with the merchant 106 offering the loyalty cards or with any partner merchants. In some embodiments, the loyalty cards are configured with either magnetic stripes or chips similar to that of payment cards, and may store data associated with merchant details, loyalty program details and total usable/redeemable loyalty point details. The loyalty cards can be swiped at POS terminals like the payment card 104 where the POS terminals read the information from the magnetic stripes or chip.

The loyalty points can be equivalent to an amount expressed in a currency and can often be used during payment transactions. For example, 100 loyalty point may be equivalent to INR 10. In scenarios where a customer such as the customer 102 is using a loyalty card to make a payment transaction, a transaction amount to be debited from the issuer account (see, 114 in FIG. 1) is calculated by deducting of a sum of money equivalent to total loyalty points available in the loyalty card from the total transaction amount.

However, in scenarios as mentioned above where loyalty cards are involved, the customer 102 may have to carry multiple physical loyalty cards, issued by multiple merchants, which the customer 102 may find unwieldy and impractical. Various embodiments of the present disclosure provide mechanisms such that the loyalty program associated with the loyalty card is integrated with the payment card 104 of the customer 102 thereby eliminating the need for the customer 102 to carry multiple physical loyalty cards to merchant establishments. An environment for facilitating integration of a loyalty program associated with a merchant loyalty card with a payment card is explained in detail with reference to FIG. 2.

Figure 2:
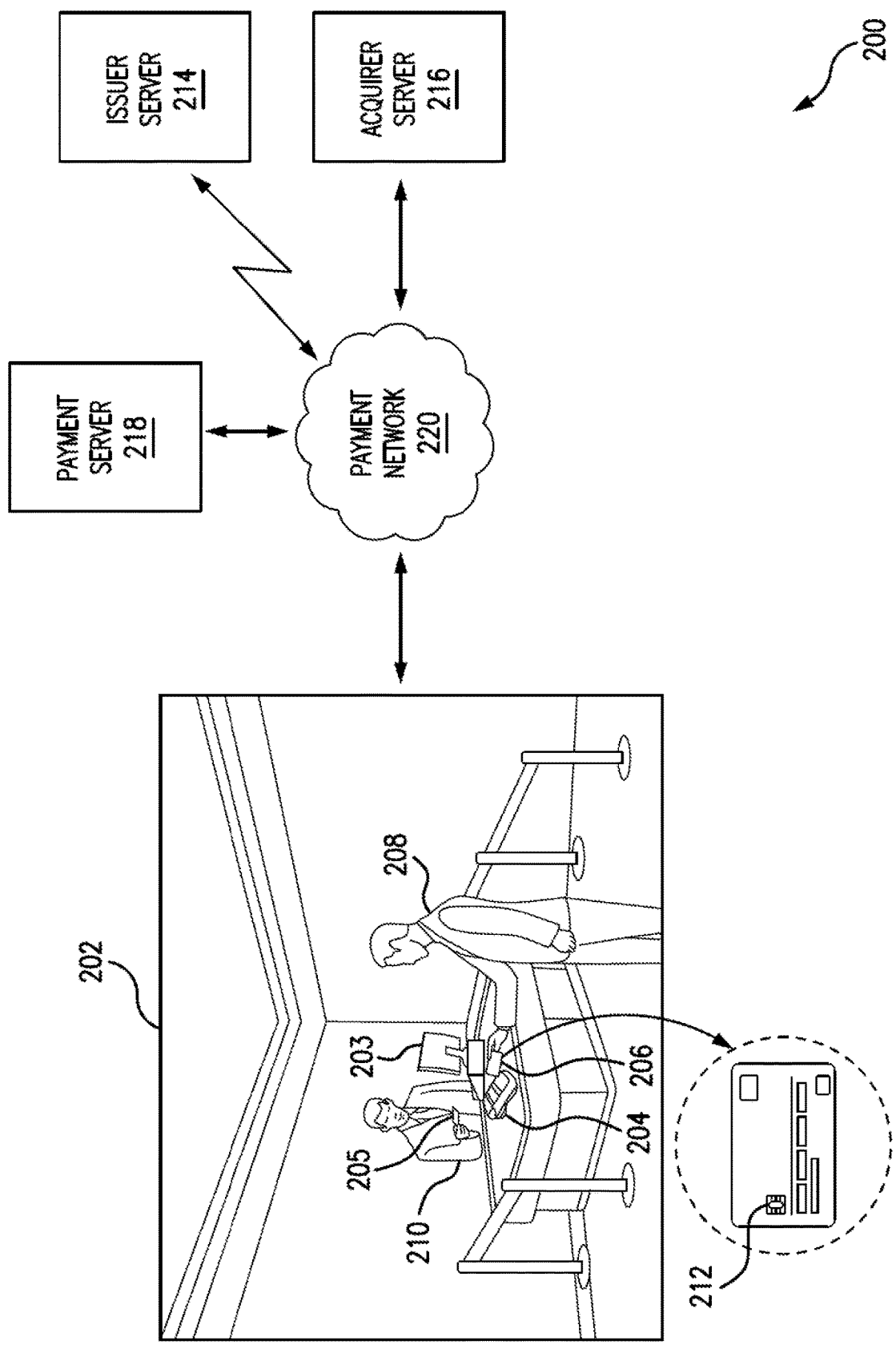
FIG. 2 illustrates an example representation of an environment, in which at least some example embodiments of the present disclosure can be implemented.

FIG. 2 illustrates an exemplary representation of an environment 200, in which at least some example embodiments of the present disclosure can be implemented. In the illustrated embodiment, a merchant facility 202 is shown as equipped with a merchant terminal/POS terminal 204 and a merchant interface device 203. In various embodiments, the merchant interface device 203 can be a telephone or a computer system operated by an agent 210 for performing payment transactions on behalf of a customer 208. As seen in FIG. 2, the merchant interface device 203 is a computer system operated by the agent 210. It shall be noted that herein the term POS terminal 204 refers to the POS machine which is used to swipe payment cards and not the entire setup including, cash drawers, printers and barcode scanners.

The merchant facility 202 may be managed by a merchant such as the merchant 106 or a group of merchants. Examples of the merchant facility 202 may include any retail shop, supermarket or establishment, government and/or private agencies, ticket counters, or any such place or establishment where customers visit for performing financial transaction in exchange of any goods and/or services or any transaction that requires financial transaction between the customers and the merchant. As can be seen from the environment 200, the customer 208 is making the financial transaction at the POS terminal 204. It shall be noted that more than one such POS terminals can be present in the merchant facility 202. In conventional scenarios, the customer 208 would reach the POS terminal 204 upon his turn and present his payment card 206 to the agent 210 managing the POS terminal 204. Thereafter, the agent 210 dips/inserts the payment card 206 of the customer 208, and the authentication of the payment card 206, checking of credit or debit balance etc., are performed, as described with reference with FIG. 1. Thereafter, the customer 208 is able to complete the payment transaction at the POS terminal 204.

During checkout, the agent 210 may request the customer 208 to integrate a loyalty program associated with a merchant loyalty card 205 with the payment card 206 of the customer 208. Upon agreement by the customer 208, the agent 210 may swipe the payment card 206 of the customer 208 and enter a transaction amount, the consumer's mobile number, and a merchant identifier (MID) of the loyalty program associated with the merchant loyalty card 205 at the POS terminal 204. Alternatively or additionally, the agent 210 may swipe the loyalty card 205 at the POS terminal 204 to provide the consumer identifier and the MID of the loyalty program associated with the merchant loyalty card 205. The loyalty card 205 may be a new loyalty card or a loyalty card already issued to the customer 208 by the merchant earlier, which the customer 208 may have handed over to the agent 210 for integration with the payment card 206. It shall be noted that the payment card 206 is a chip enabled payment card for the purpose of storing the consumer identifier and the MID in the payment card 206 and integrating the loyalty program with the payment card 206 in this disclosure.

A payment transaction request is initiated at the POS terminal 204 for a purchase of goods made by the customer 208 at the merchant facility 202. The payment transaction request includes a transaction amount associated with the purchase of goods, the consumer identifier, such as a consumer mobile number or e-mail address of the consumer, and the MID. The payment transaction request is received by an acquirer server 216 (an example server system) which sends it to a payment server 218 (an example server system). The payment server 218 sends the payment transaction request to an issuer server 214 through a payment network 220. The payment network 220 is an example of the payment card interchange network/payment network 110 and is described with reference to FIG. 1. In some cases, the issuer server 214, the acquirer server 216 and the payment server 218 can be a single entity, or any two of these servers may be a single entity.

The issuer server 214 authenticates the payment card 206 of the customer 208. A machine-readable script is generated by the issuer server 214. The machine-readable script generated by the issuer server 214 comprises codes or instructions that encodes the consumer identifier and MID. The instructions are executable at the POS terminal 204. The issuer server 214 sends a notification including a payment transaction approval message and the machine-readable script or a payment transaction decline message to the POS terminal 204 through the payment server 218 and the payment network 220. Simultaneously or subsequently, the issuer server 214 debits funds equal in amount to the transaction amount from an issuer account (such as the issuer account 114) of the customer 102. The payment is passed to a merchant account (acquirer account) of the merchant (such as the merchant 106) associated with the merchant facility 202 to complete the payment transaction. The POS terminal 204 includes the capability to execute the machine-readable script to store the consumer identifier and MID in a chip 212 of the payment card 206 to complete the process of integration of the loyalty card 205 with the payment card 206 of the customer 208.

A non-exhaustive example embodiment of integrating the loyalty program with the payment card 206 is described with reference to FIG. 3.

Figure 3:
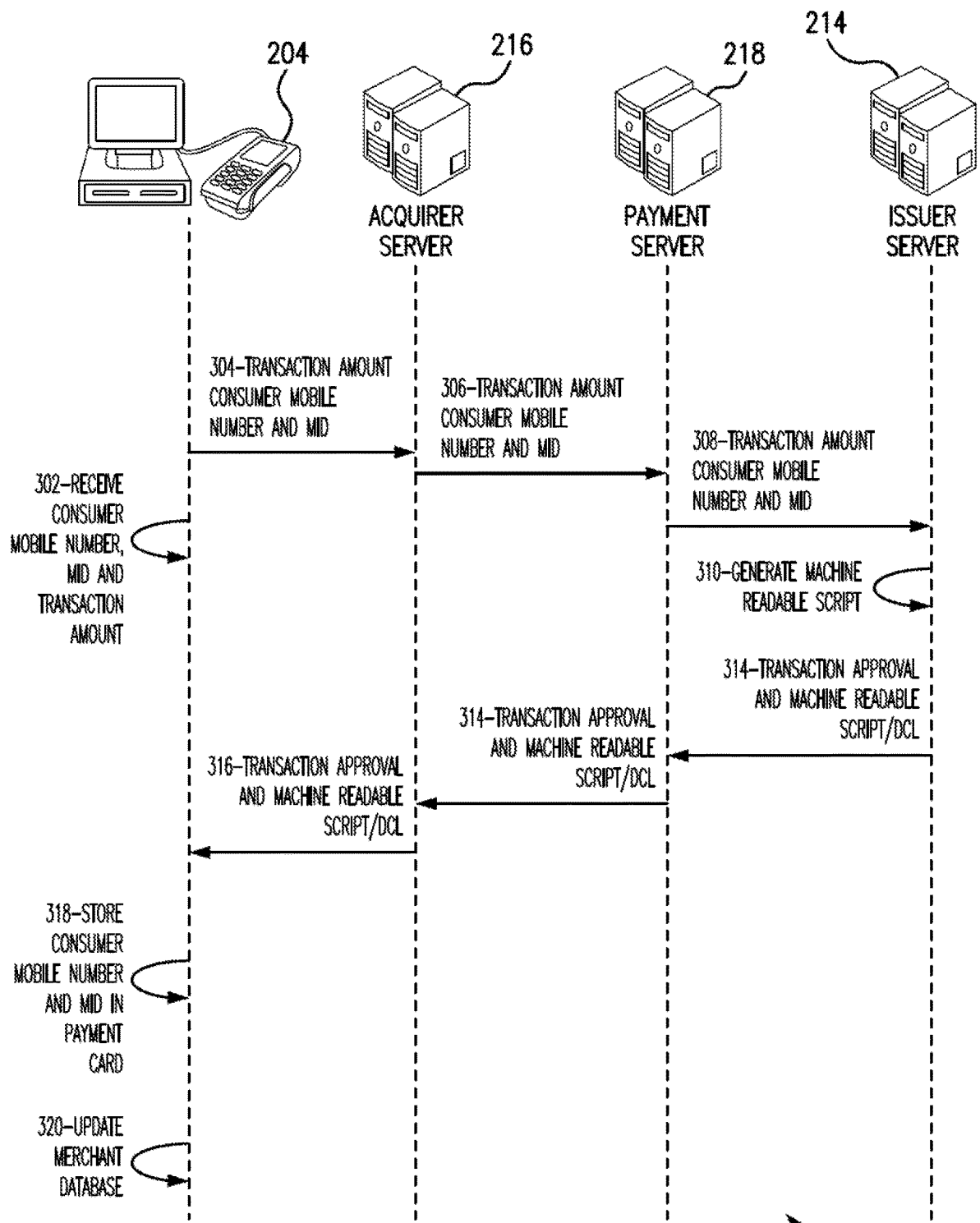
FIG. 3 represents a sequence flow diagram representing integration of a loyalty program offered by a merchant with a payment card of a customer, in accordance with an example embodiment.

FIG. 3 includes a simplified schematic flow diagram 300 representing a method of integration of a loyalty program offered by a merchant with a payment card of a customer, in accordance with an example embodiment. The customer 208 is in queue waiting for his turn to reach the POS terminal 204 to perform payment transaction using his payment card 206.

At 302, the POS terminal 204 receives the consumer identifier, such as a consumer mobile number, the MID and a transaction amount associated with the goods purchased at the merchant facility 202. The consumer mobile number, the MID and a transaction amount are collectively referred to as the payment transaction request in this disclosure. It shall be noted that the POS terminal 204 scan/reads customer data stored in the chip 212 of the payment card 206. The agent 210 may key-in the transaction amount and the consumer mobile number and the MID. Alternatively, or additionally, the agent 210 may swipe a merchant loyalty card (such as the card 205) at the POS terminal 204. The merchant loyalty card 205 may be a new loyalty card or a loyalty card already issued to the customer 208 during previous transactions. In an example, the merchant loyalty card 205 may have to be swiped before the payment card 206 is swiped at the POS terminal 204 because once the payment card 206 is swiped it is required that the payment card 206 remain inserted into the POS terminal 204 until it is online and connected to the payment network 220. However, in other examples, the merchant loyalty card 205 may be inserted after the insertion of the payment card 206, or both cards can be inserted simultaneously.

In another embodiment, for integration of a loyalty program with the payment card 206 of a customer, the POS terminal 204 may send only a consumer identifier, such as the 53705 number, and an MID associated with the loyalty program without having to include a transaction amount. It shall be noted that it is not always necessary that the consumer mobile number and the MID need to be sent along with a payment transaction amount. This means that a loyalty program may be integrated with the payment card 206 of the customer without the customer having to make a payment transaction using the payment card 206. The customer can always walk up to an agent and request the agent to integrate a loyalty program with the payment card 206 of the customer without any purchase of goods and financial transactions being involved. However, the payment card 206 will always be swiped (or inserted to read) at the POS terminal 204 to read customer data from the payment card 206.

At 304, the transaction amount, the consumer identifier (consumer mobile number) and the MID are sent to the acquirer server 216. The acquirer server 216 may be associated with a merchant account to which the transaction amount will be credited from the issuer account of the customer.

At 306, the transaction amount, the consumer mobile number and the MID are sent to the payment server 218. The payment server 218 may maintain a master database which includes a 'transaction processing table' (shown in FIG. 15). The transaction processing table stores details such as Issuer ID, POS ID, country code, acquirer ID, consumer identifier (consumer mobile number) and MID, among others. Upon receiving the payment transaction request from the acquirer server 216, the payment server 218 may perform a lookup into the transaction processing table to check the authenticity of the POS terminal 204, the consumer mobile number and the MID.

At 308, the transaction amount, the consumer mobile number and the MID are sent to the issuer server 214. The issuer server 214 verifies the payment card 206 of the customer 208, approves the transaction request, and processes the payment from the issuer account to the acquirer account via the payment server 218. Details of the payment transaction from the issuer account to the merchant account are not provided herein in detail for the sake of brevity. For instance, in a non-limiting example, upon receiving a correct fixed character length PIN or a fixed character length one time password (OTP) from the customer 208, the customer 208 is validated and authenticated by the issuer server 214, and transaction amount is settled between the issuer account and the acquirer account via the payment server 218.

At 310, the issuer server 214 generates a machine-readable script. The machine-readable script includes executable codes or instructions. The machine-readable script may be an example of or similar to an EMV script that allows writing of information onto a storage device. An example of such an EMV script may be a PUT script. The machine-readable script includes instructions/commands that allow changing or updating one or more parameters and values of the payment card 206 while the payment card 206 is online and connected to the payment network 220. The consumer mobile number and MID are encoded in the machine-readable script.

At 312, a notification including a payment transaction approval or decline message is sent to the payment server 218 from the issuer server 214 via the payment network 220. Along with the payment transaction approval message, the machine-readable script is sent to the payment server 218 from the issuer server 214 via the payment network 220. In case of a transaction decline, the machine-readable script may not be sent to the payment server 218. At 314, the notification including the payment transaction approval message and the machine-readable script or decline message, is sent to the acquirer server 216 from the payment server 218.

At 316, the notification including the payment transaction approval message and the machine-readable script, or the decline message, is sent to the POS terminal 204 from the acquirer server 216. At this instant, when the notification including the payment transaction approval message and the machine-readable script is received by the POS terminal 204, the payment transaction is completed. It shall be noted that, the notification may further include a POS ID of the POS terminal 204 associated with the merchant facility 202 such that the notification is received by the specific POS terminal 204 sending the payment transaction request. In an example, the merchant facility 202 may include a plurality of POS terminals and each POS terminal at the merchant facility 202 may have a unique POS IDs, or all POS terminals present in the merchant facility 202 may have the same POS ID. The POS ID and the facility information may be provided by the payment server 218 or it may also be fetched from the transaction processing table (not shown) maintained at the payment server 218. Additionally, POS ID and the facility information may be fetched from an issuer database associated with the issuer server 214. Sending the POS ID in the notification facilitates execution of the machine-readable script by the specific POS terminal 204 sending the payment transaction request.

At 318, the POS terminal 204 stores the consumer identifier (consumer mobile number) and the MID in the chip 212 of the payment card 206. Storing the consumer mobile number and the MID in the payment card 206 facilitates integration or association of the loyalty program represented by the consumer mobile number with the payment card 206 of the customer 208. A processor of the POS terminal 204 executes the machine-readable script. The POS terminal 204 may be configured to read and decode the information (consumer mobile number and MID) encoded in the machine-readable script generated by the issuer server 214. In other words, the POS terminal 204 writes the consumer mobile number and MID onto the chip 212 of the payment card 206 by using techniques including but not limited to issuer script processing (e.g., by executing the instructions included in the machine-readable script generated by the issuer server 214). At 320, a merchant database is updated. The merchant database is explained in detail with reference to FIG. 6. Once a loyalty program is integrated with the payment card 206 of the customer 208, the merchant awards loyalty benefits by adding loyalty points worth any unit of currency (e.g. for a transaction of INR 100, ten (10) loyalty points may be awarded) into the loyalty program integrated with the payment card 206 of the customer 208. Awarding of loyalty points is explained with reference to FIG. 4.

Figure 4:
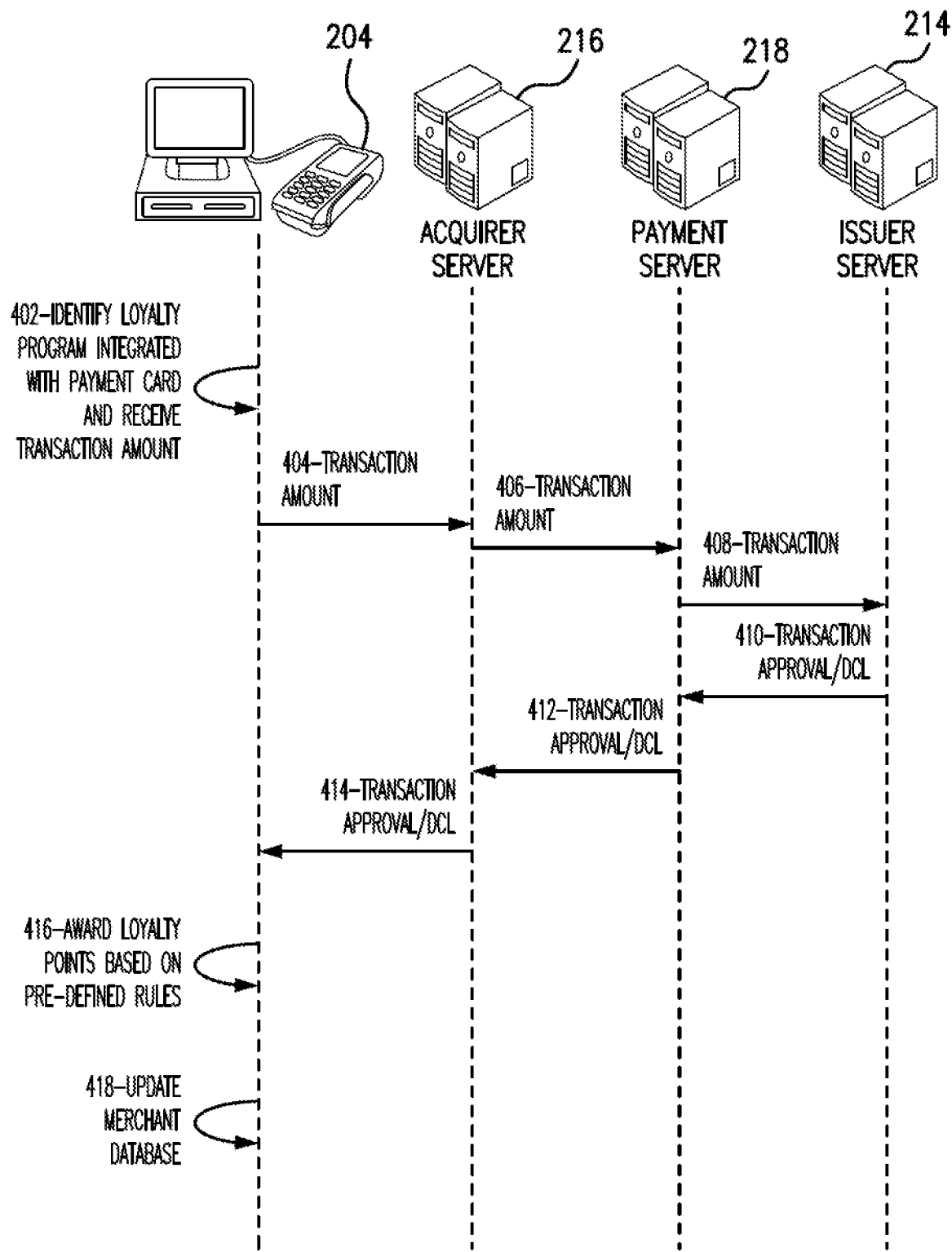
FIG. 4 represents a sequence flow diagram representing awarding of loyalty points to the loyalty program in the payment card as a result of payment transactions made with the merchant, in accordance with an example embodiment.

FIG. 4 represents a sequence flow diagram 400 representing a method of awarding loyalty points to the loyalty program in the payment card as a result of payment transactions made with the merchant, in accordance with an example embodiment. The customer 208 who has a loyalty program integrated with his/her payment card 206 is waiting to complete a payment transaction at the POS terminal 204 using his/her payment card 206.

At 402, the POS terminal 204 identifies a loyalty program (such as the loyalty program associated with the merchant loyalty card 205) integrated with the payment card 206 when the payment card 206 is presented to the POS terminal 204. For instance, the POS terminal 204 reads the chip 212 of the payment card 206 of the customer 208 and detects the consumer identifier (consumer mobile number) and MID from the chip 212. Upon detection of the consumer mobile number and MID, the POS terminal 204 retrieves information on the loyalty program represented by the consumer mobile number from the merchant database. It shall be noted that, to read the information from the chip 212, the POS terminal 204 is configured with a script (e.g., EMV GET script).

At 404, the POS terminal 204 sends the transaction amount to an acquirer server (such as the acquirer server 216). At 406, the transaction amount is sent to the payment server 218. At 408, the transaction amount is sent to the issuer server 214 associated with an issuer bank in which the customer has an issuer account. The issuer server 214 verifies the payment card 206 of the customer 208, approves the transaction request, and processes the payment from the issuer account to the merchant account via the payment server 218. Details of the payment transaction from the issuer account to the merchant account are not provided herein in detail for the sake of brevity.

At 410, the issuer server 214 sends a notification including a payment transaction approval message or decline message to the payment server 218. At 412, the notification is sent to the acquirer server 216. At 414, the notification is sent to the POS terminal 204. At this instant, when the notification including the payment transaction approval message or decline message is received by the POS terminal 204, the payment transaction is completed or declined.

If the payment transaction is completed, at 416, the POS terminal 204 awards or adds loyalty points to the loyalty program integrated with the payment card 206 based on one or more predefined rules. Pre-defined rules may be stored in the merchant database. The POS terminal 204 retrieves the loyalty program details from the merchant database at 402. An example pre-defined rule may be such as, for a transaction of INR 100, loyalty point equal to 1 will be awarded to the payment card, etc. Another example pre-defined rule may state that the customer 208 can redeem only 50% of the total loyalty points till the first year of membership and the validity of the loyalty points/loyalty program is 3 years from the date of enrolment into membership of the customer, among others. As per the first example pre-defined rule, if a transaction amount is INR 2500, then 25 loyalty points may be awarded to the loyalty program integrated with the customer's payment card 206. At 418, the merchant database is updated. The merchant database may be updated with information on addition of loyalty points as awards to the loyalty program integrated with the payment card 206 of the customer 208. It shall be noted that loyalty point may be awarded when the customer 208 makes transaction with one or more partner merchants associated with the merchant offering the merchant loyalty card 205 to the customer 208.

Figure 5:
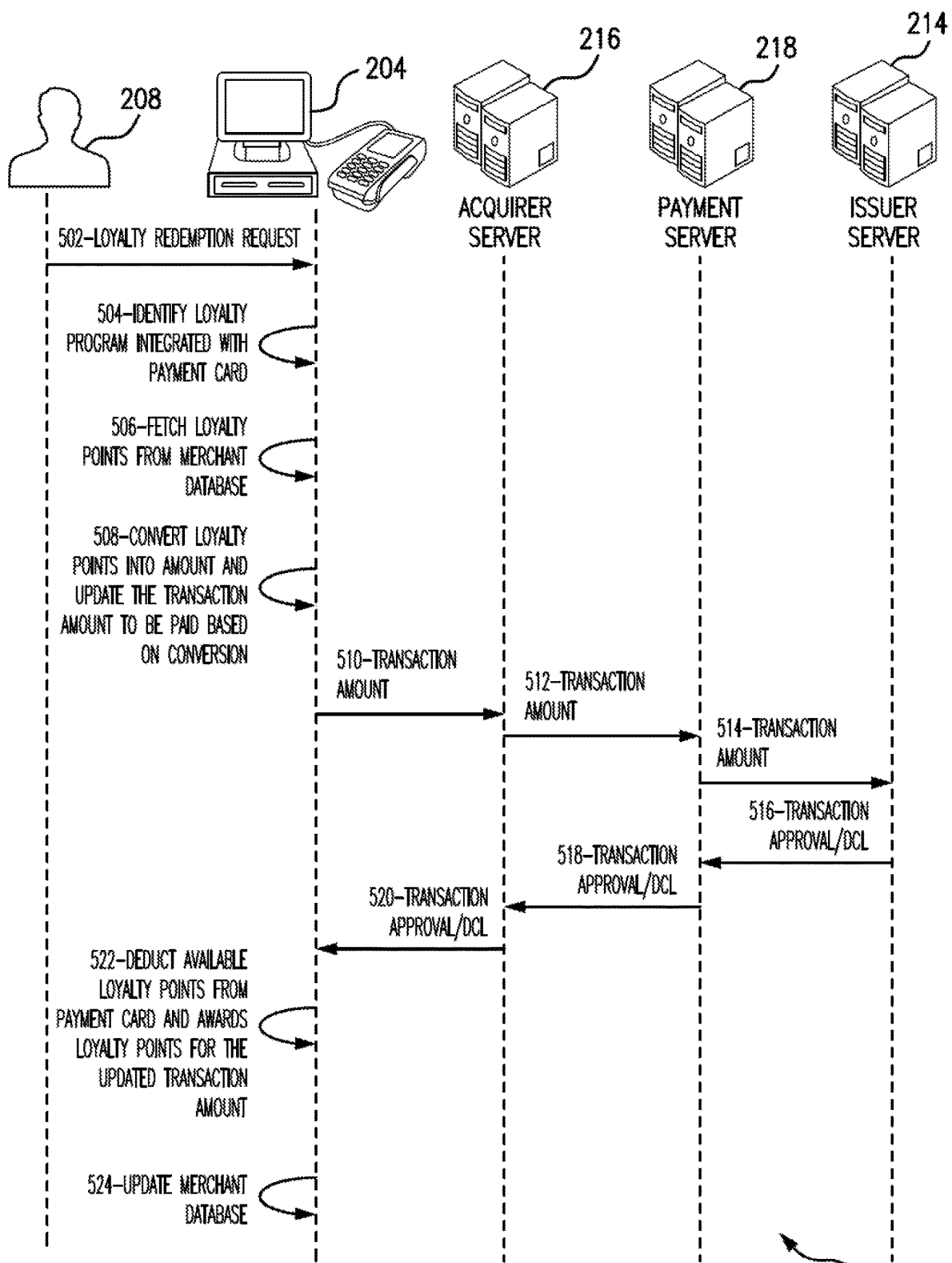
FIG. 5 represents a sequence flow diagram representing redemption of loyalty points from the loyalty program in the payment card, in accordance with an example embodiment.

FIG. 5 represents a sequence flow diagram 500 representing a method of redemption of loyalty points from the loyalty program in the payment card, in accordance with an example embodiment. Loyalty points can be redeemed from the loyalty points awarded at operation 416 explained with reference to FIG. 4. It shall be noted that loyalty point may be redeemed when the customer 208 makes transaction with one or more partner merchants associated with the merchant offering the merchant loyalty card 205 to the customer 208. To redeem loyalty points, the customer 208 may wait in queue for his/her turn to reach the POS terminal 204 to perform payment transaction using his payment card 206 or using loyalty points or both. The customer 208 requests an agent (such as the agent 210) to use loyalty points from the loyalty program integrated with the payment card 206 while handing over the payment card 206 to the agent 210 for performing the payment transaction.

At 502, the customer 208 initiates a redemption request at the POS terminal (e.g., the POS terminal 204) at a checkout counter of a merchant facility (such as the merchant facility 202). In another embodiment, the customer 208 or the agent 210 may be facilitated to enter or provide a command or request at a merchant interface device (such as the merchant interface device 203) or at an interface of the POS terminal 204 for the redemption.

At 504, the POS terminal 204 identifies a loyalty program integrated with the payment card 206. The POS terminal 204 reads the chip 212 of the payment card 206 of the customer 208 and identifies the consumer identifier (consumer mobile number in this example) and MID from the chip 212. Upon identification of the consumer mobile number and MID, the POS terminal 204 retrieves information on the loyalty program represented by the consumer mobile number from the merchant database. At 506, the POS terminal 204 fetches available redeemable loyalty points from the merchant database. At 508, the POS terminal 204 converts the loyalty points into an amount in a unit of currency (e.g., INR) and updates the transaction amount to be paid based on the conversion. In another embodiment, the POS terminal 204 allows the agent (e.g., the agent 210 at the merchant facility 202) to manually convert the loyalty points into an amount and update the transaction amount to be paid based on the conversion. The merchant database may include pre-defined rules for conversion of loyalty points into an amount. As an example, a pre-defined rule for conversion may state that, 10 loyalty points are equivalent to INR 1. Hence, a total of 1000 loyalty points amounts to INR 100 upon conversion. In an example scenario, if an initial transaction amount is INR 500 and loyalty points (1000 loyalty points) worth INR 100 is available for redemption, the updated transaction amount to be debited from an issuer account of the customer 208 is INR 400.

At 510, the updated transaction amount is sent to an acquirer server (such as the acquirer server 216). At 512, the updated transaction amount is sent to the payment server 218 from the acquirer server 216 through the payment network 220. At 514, the updated transaction amount is sent to the issuer server 214 from the payment server 218 through the payment network 220. The issuer server 214 verifies the payment card 206 of the customer 208, approves the transaction request, and processes the payment from the issuer account to the merchant account via the payment server 218. Details of the payment transaction from the issuer account to the acquirer account are not provided herein in detail for the sake of brevity.

At 516, the issuer server 214 sends a notification including a payment transaction approval message or decline message to the payment server 218. At 518, the notification is sent to the acquirer server 216. At 520, the notification is sent to the POS terminal 204. At this instant, when the notification including the payment transaction approval message or decline message is received by the POS terminal 204, the payment transaction is completed or declined.

If the transaction is completed, at 522, the POS terminal 204 deducts the loyalty points from the payment card 206 and awards loyalty points for the updated transaction amount. Referring to the example above, the POS terminal 204 deducts 1000 loyalty points that amount to INR 100 from the payment card 206. In an example, the customer 208 may be allowed to redeem only a percentage of the total loyalty points in one transaction. Further, for the updated transaction amount, i.e. INR 400, loyalty points equivalent to 40 will be awarded to the loyalty program integrated with the payment card 206 based on predefined rules.

FIG. 6 is an example representation of a table 600 maintained at a merchant database associated with a merchant offering the merchant loyalty card 205. As seen in FIG. 6, the table 600 includes listings of an MID, an associated consumer identifier (such as a consumer mobile number), rules/criteria for awarding loyalty points to a loyalty program represented by the consumer mobile number, and rules/criteria for conversion of loyalty points into an amount, validity of the loyalty program, plurality of payment cards having the loyalty program integrated and redeemable loyalty points against each payment card. It shall be noted that the table 600 shown in FIG. 6 is only exemplary and for the purposes of explanation. In practical, the merchant database may include multiple such tables and each table may have more or less columns and rows than depicted in FIG. 6.

The table 600 includes columns representing a MID field 602, a consumer mobile number field 604, a rules field 606, a validity of loyalty points/loyalty program field 608, and payment cards field 610 and a redeemable loyalty points against card field 612. The table 600 may include as many rows as number of loyalty programs available with the merchant. As an example, a row 650 depicts that for a merchant with the MID "MC11", the associated consumer mobile number is "777-123-4567" that represents a loyalty program including three rules. (It should be understood, however, that "consumer mobile number" field 604 may instead, or in addition to, include another type or types of consumer identifier, such as one or more e-mail addresses of the consumer). In this example, the customer mobile number may be a mobile telephone number which has been assigned to the customer's mobile device, for example, by a mobile network operator (MNO). The customer mobile number may include, for example, a country code, an area or city code, and a unique customer telephone number. Examples of rules in the rules field 606 may include rule 1, wherein for a transaction of every INR 10, 1 loyalty point will be awarded to the loyalty program. According to rule 2, only 50% of total points are redeemable till $1^{st}$ year of membership, and 100% of total points are redeemable from $2^{nd}$ year of membership. According to rule 3, 10 loyalty point amounts to INR 1 and so on. The row 650 further depicts that the validity of the loyalty program associated with the consumer identifier (customer mobile number) is Mar. 31, 2019. The row 650 under the column 610 is divided into a plurality of sub rows that include plurality of payment cards (such as the payment card 206) that may have had the loyalty program represented by the LID "MCAB123#" integrated with them. The row 650 under the column 612 is further divided into a plurality of sub rows that include redeemable loyalty points against each of the payment cards depicted in the row 650 under the column 610. In some embodiments, the merchant may allow a customer to aggregate all of the loyalty points spread amongst the customer's payment cards when redeeming loyalty points for a purchase transaction and/or to obtain other awards.

Figure 7A:
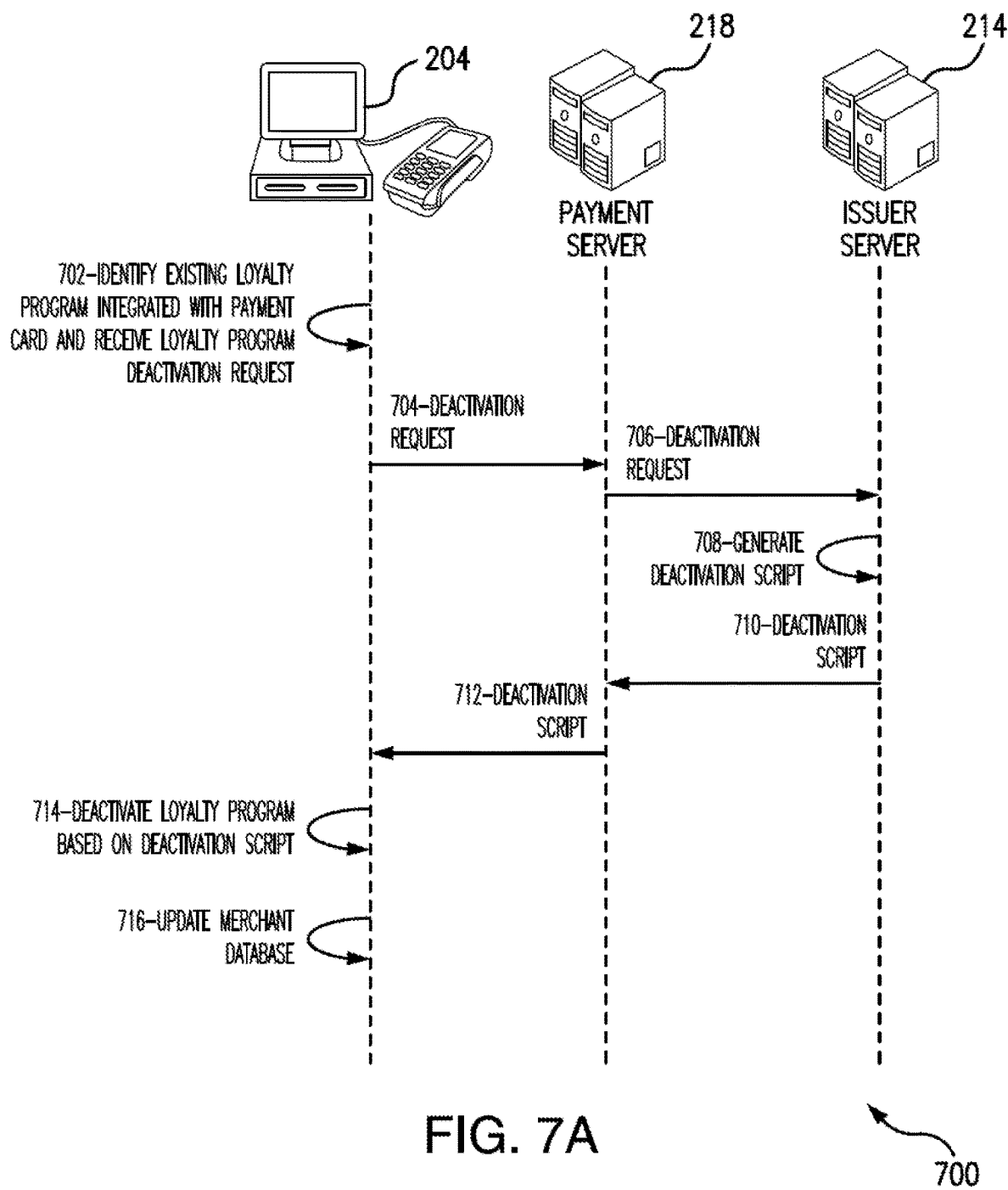
FIGS. 7A and 7B represent sequence flow diagrams representing deactivation of an existing loyalty program in the payment card, in accordance with an example embodiment.

FIG. 7A represents a sequence flow diagram 700 representing a method of deactivation of an existing loyalty program in the payment card, in accordance with an example embodiment. An existing loyalty program integrated with a payment card (e.g., the payment card 206) of a customer may be deactivated on request of the customer. Alternatively, deactivation may be performed by a merchant through a merchant interface device (such as the merchant interface device 203). In an embodiment, deactivation of an existing loyalty program from a payment card may take place simultaneously with integration of a loyalty program/new loyalty program with the payment card. For simultaneously deactivating an existing loyalty program and integrating of a new loyalty program, the payment transaction request may be combined with a deactivation request. The payment transaction request includes a transaction amount, a consumer identifier (consumer mobile number) and an MID.

In another embodiment, a deactivation of an existing loyalty program need not take place only when a payment transaction is involved. A customer may approach the POS terminal 204 to only deactivate a loyalty plan without having to make a financial transaction. In FIG. 7A, the steps involving integration of a loyalty program/new loyalty program with the payment card 206 are not shown and only the steps involving deactivation of a loyalty program in the payment card 206 are shown. Hence, the sequence flow diagram 700 bypasses the steps performed by an acquirer server (such as the acquirer server 216).

A loyalty program may be deactivated by the merchant if the loyalty program is no longer active or if the merchant is no more offering any loyalty programs. In an example scenario, the customer 208 may approach the POS terminal 204 to deactivate an existing loyalty program integrated with the payment card 206 of the customer 208. An agent (such as the agent 210) dips/inserts the payment card 206 of the customer 208 at the POS terminal 204.

At 702, the POS terminal 204 identifies an existing loyalty program integrated with the payment card 206 and receives a deactivation request. In another embodiment, the customer 208 or the agent 210 may be facilitated to enter or provide a deactivation command or request at a merchant interface device (such as the merchant interface device 203) or at an interface of the POS terminal 204. Identification of a loyalty program by the POS terminal 204 is explained at operation 402 with reference to FIG. 4.

At 704, a deactivation request is sent to the payment server 218. At 706, the deactivation request is sent to the issuer server 214. At 708, the issuer server 214 generates a deactivation script. The deactivation script includes instructions executable by the POS terminal 204 for erasing or deleting the stored consumer identifier (consumer mobile number) and MID from the chip 212 of the payment card 206 thereby deactivating the loyalty program form the payment card 206.

At 710, the deactivation script is sent to the payment server 218. At 712, the deactivation script is sent to the POS terminal 204. At 714, the POS terminal 204 deactivates the existing loyalty program by executing the deactivation script and thereby erasing or deleting the stored consumer mobile number and MID from the chip 212 of the payment card 206 based on the deactivation script. At 716, the merchant database is updated.

Figure 7B:
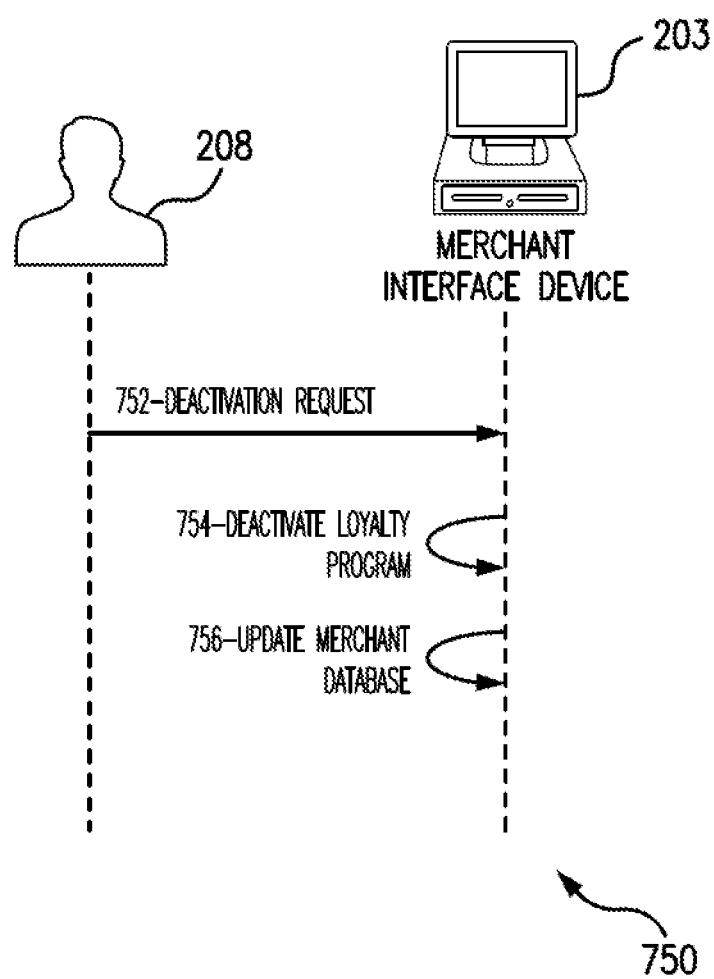

FIG. 7B represents sequence flow diagram 750 representing another method of deactivation of an existing loyalty program in the payment card, in accordance with an example embodiment. In this method, a payment card may not be required. A customer (such as the customer 208) may request a merchant to deactivate an existing loyalty program integrated with his/her payment card 206. On the contrary, the merchant, may, initiate deactivation of an existing loyalty program.

At 752, a merchant interface device (such as the merchant interface device 203) receives a deactivation request from the customer 208. In another embodiment, the customer 208 or the agent 210 may be prompted to enter or provide a deactivation command or request at the merchant interface device 203. At 754, the merchant interface device 203 deactivates the loyalty program based on the request. At 756, the merchant interface device 203 updates the merchant database.

Figure 8:
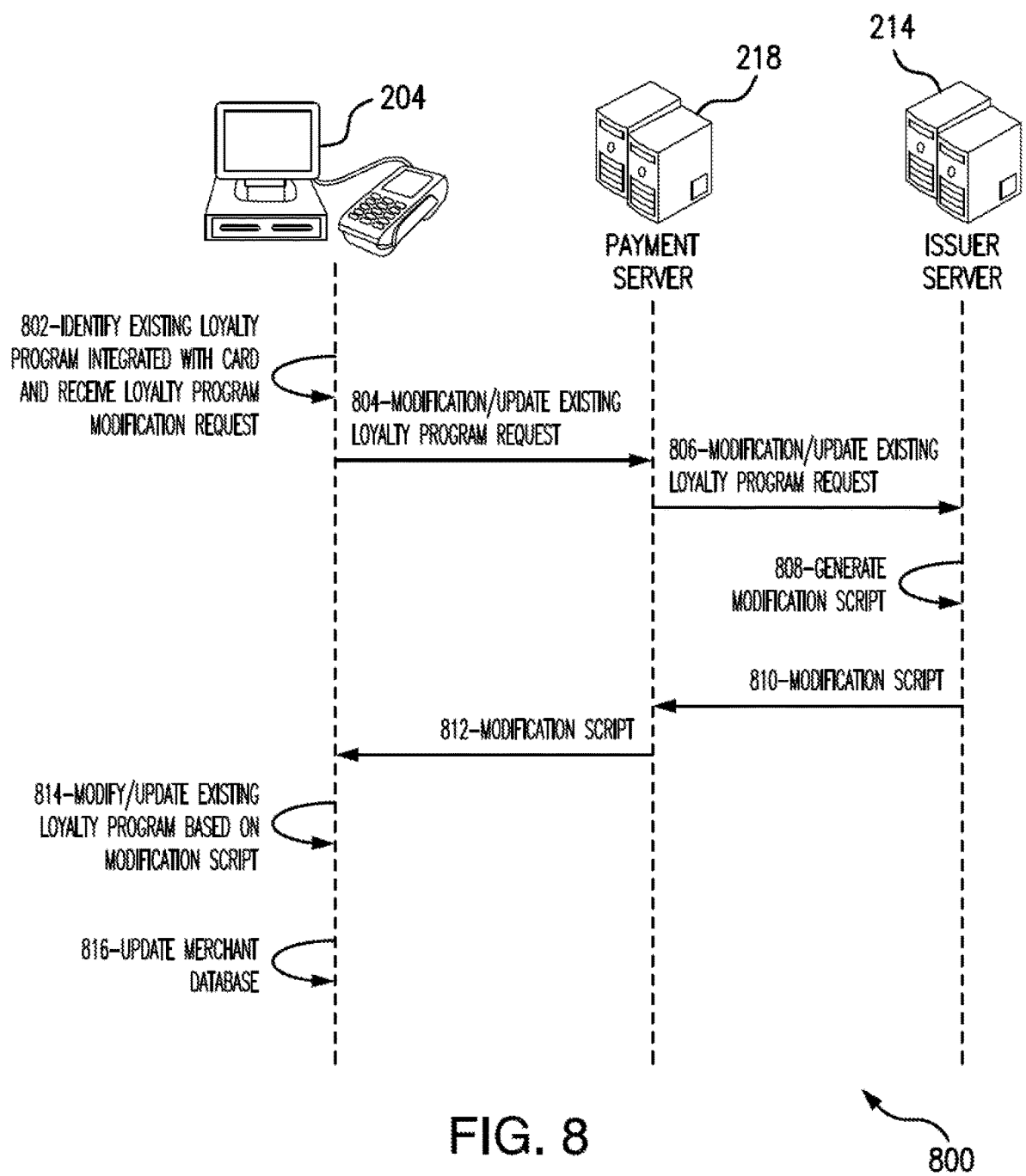
FIG. 8 represents a sequence flow diagram representing modification of an existing loyalty program in the payment card, in accordance with another example embodiment.

FIG. 8 represents a sequence flow diagram 800 representing modification of an existing loyalty program in the payment card, in accordance with an example embodiment. A loyalty program may be modified/updated by the merchant if the merchant has modified one or more parameters of an existing loyalty program or if an existing loyalty program has become obsolete. In an embodiment, modification of an existing loyalty program integrated with a payment card may take place during payment transactions. For simultaneously modifying an existing loyalty program during payment transactions the payment transaction request may be combined with a modification request. It shall however be noted that for modification of a loyalty program in the payment card of a customer, the POS terminal may send only a modification request to the server system without having to include a payment transaction request. This means that a loyalty program in the payment card of the customer may be modified without the customer having to make a payment transaction using the payment card. However, in most cases, modification of a loyalty program may be performed at the backend at the merchant interface device 203, which might not require the payment card to be swiped at the POS terminal. In FIG. 8, the steps involving transaction request/transaction amount are not shown and only the steps involving modification of a loyalty program are shown. Hence, the sequence flow diagram 800 bypasses the steps performed by an acquirer server (such as the acquirer server 216).

Herein update or modify may refer to modification or alteration of one or more parameters associated with the loyalty program. In an example scenario, the customer 208 may approach the POS terminal 204 to modify an existing loyalty program integrated with the payment card 206 of the customer 208. An agent (such as the agent 210) dips/inserts the payment card 206 of the customer 208 at the POS terminal 204.

At 802, the POS terminal identifies an existing loyalty program integrated with the payment card and receives a modification request. In another embodiment, the customer 208 or the agent 210 may be facilitated to enter or provide a modification command or request at a merchant interface device (such as the merchant interface device 203) or at the POS terminal 204. Identification of a loyalty program by the POS terminal 204 is explained at operation 402 with reference to FIG. 4.

At 804, a modification request is sent to the payment server 218. At 806, the modification request is sent to the issuer server 214. At 808, the issuer server 214 generates a modification script. The modification script includes instructions executable by the POS terminal 204 for altering or updating one or more parameters of the loyalty program in the payment card 206.

At 810, the modification script is sent to the payment server 218. At 812, the modification script is sent to the POS terminal 204. At 814, the POS terminal 204 updates the existing loyalty program with a modified loyalty program by executing the modification script. Modification herein refers to application of changes to various parameters of a loyalty program stored in the chip 212 of the payment card 206 of the customer 208. At 816, the merchant database is updated.

Figure 9:
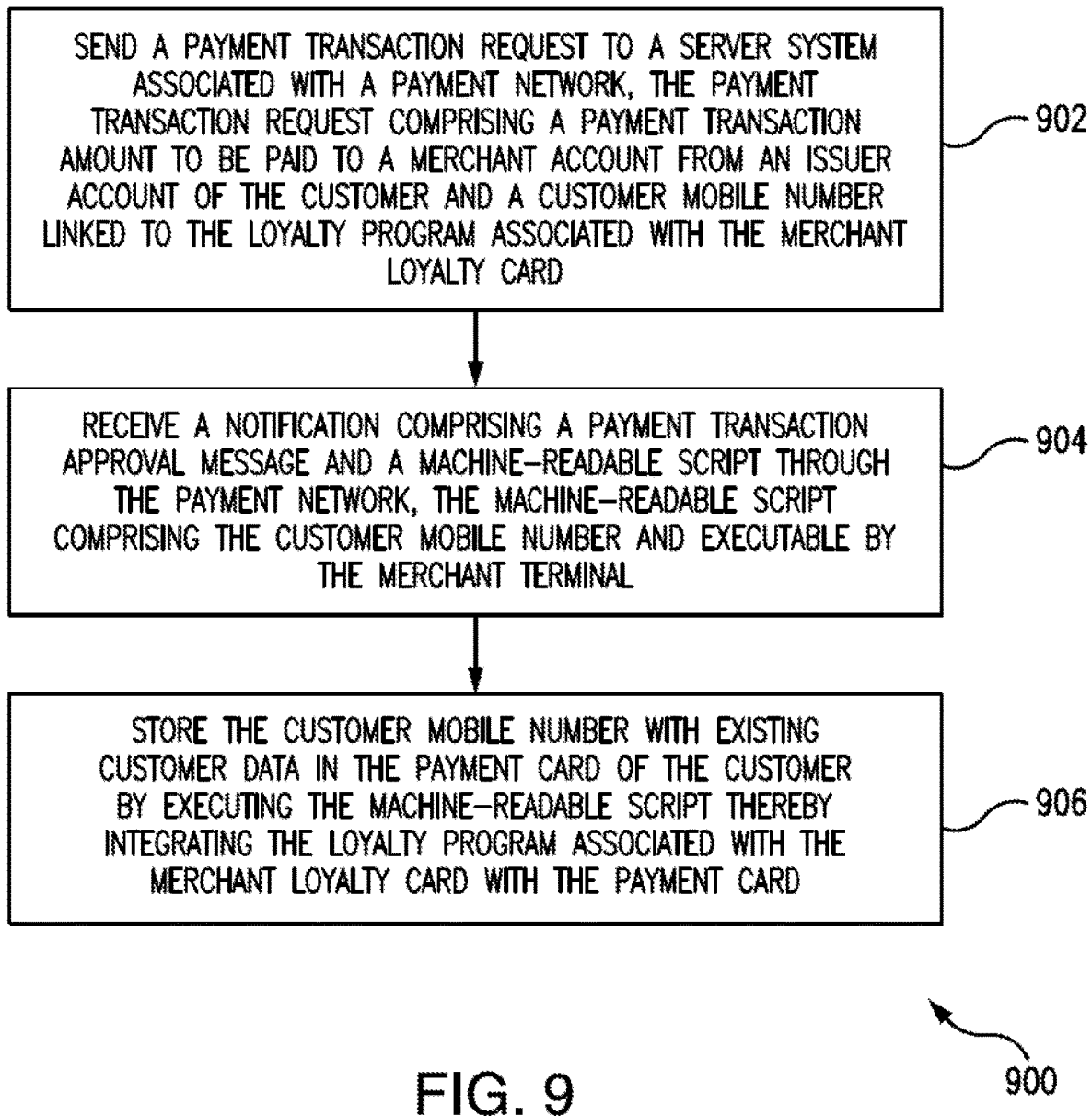
FIG. 9 illustrates a flow diagram of a method of integrating a loyalty program with a payment card, in accordance with an example embodiment.

FIG. 9 illustrates a flow diagram of a method 900 for integrating a loyalty program with a payment card, in accordance with one embodiment of the present disclosure. The method 900 depicted in the flow diagram may be executed by, for example, the merchant terminal or the POS terminal 204. Operations of the flow diagram 900, and combinations of operation in the flow diagram 900, may be implemented by, for example, hardware, firmware, a processor, circuitry and/or a different device associated with the execution of software that includes one or more computer program instructions. The operations of the method 900 are described herein with help of the POS terminal 204. It is noted that the operations of the method 900 can be described and/or practiced by using a system other than the POS terminal 204, such as the merchant interface device 203. The method 900 starts at operation 902.

At 902, the POS terminal 204 sends a payment transaction request to a server system associated with the payment network 220. The payment transaction request includes a payment transaction amount to be paid to a merchant account from an issuer account of a customer (such as the customer 208) and a consumer identifier (such as a consumer mobile number) linked to the loyalty program associated with the merchant loyalty card. The consumer mobile number identifies or represents a loyalty program associated with a merchant loyalty card (e.g., the merchant loyalty card 205) offered by a merchant. The payment transaction request further includes an MID that identifies the merchant offering the merchant loyalty card. The payment transaction request is sent to an acquirer server (such as the acquirer server 216) from the POS terminal 204. The payment transaction request is received at a payment server (such as the payment server 218) from the acquirer server 216. Further, the payment transaction request is received at an issuer server (such as the issuer server 214) from the payment server 218. The transmission of the payment transaction request is facilitated between the servers through a payment network (such as the payment network 220).

At 904, the POS terminal 204 receives a notification comprising a payment transaction approval message and a machine-readable script through the payment network 220. The machine-readable script includes the consumer identifier (the consumer mobile number in this example) and the MID encoded into the script. The machine-readable script is further executable by the POS terminal 204. The POS terminal 204 is further equipped with similar script that allows reading of information stored in chips of payment cards. It shall be noted that the notification may also include a payment transaction decline message indicating that the transaction is declined by the issuer server.

At 906, the POS terminal 204 stores the consumer mobile number associated with the merchant loyalty card with existing customer data in the payment card of the customer by executing the machine-readable script thereby integrating the loyalty program with the payment card.

Figure 10:
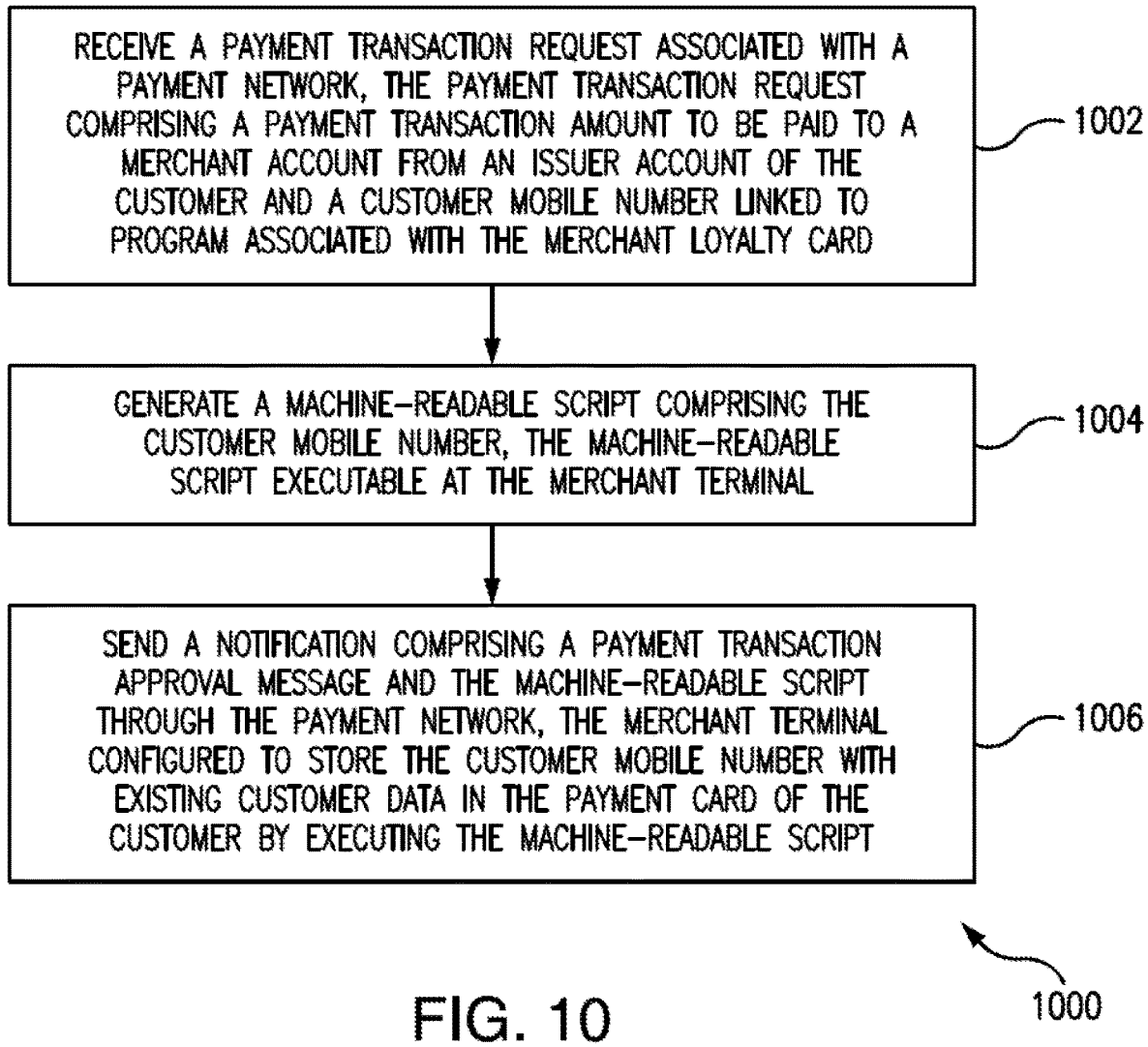
FIG. 10 illustrates another flow diagram of a method of integrating a loyalty program with a payment card, in accordance with an example embodiment.

FIG. 10 illustrates a flow diagram of a method 1000 for integrating a loyalty program with a payment card, in accordance with one embodiment of the present disclosure. The method 1000 depicted in the flow diagram may be executed by, for example, the issuer server 214, Operations of the flow diagram 1000, and combinations of operation in the flow diagram 1000, may be implemented by, for example, hardware, firmware, a processor, circuitry and/or a different device associated with the execution of software that includes one or more computer program instructions. The operations of the method 1000 are described herein with help of the issuer server 214. It is noted that the operations of the method 1000 can be described and/or practiced by using a system other than the issuer server 214, such as the payment server 218. The method 1000 starts at operation 1002.

At 1002, a payment transaction request is received by the issuer server 214 associated with the payment network 220. Generally, the payment transaction request will be received at the issuer server 214 from the payment server 218. The payment transaction request includes a payment transaction amount to be paid to a merchant account from an issuer account of the customer and a consumer identifier (such as a consumer mobile number) linked to the loyalty program associated with the merchant loyalty card. The payment transaction request further includes an MID that identifies the merchant offering the merchant loyalty card.

At 1004, the issuer server 214 generates a machine-readable script comprising the consumer mobile number and the MID. The machine-readable script includes instructions that encodes the consumer mobile number and the MID and are executable by the POS terminal 204. The machine-readable script is similar to EMV (EMV PUT) script that allows writing of information in a storage device.

At 1006, the issuer server 214 sends a notification comprising a payment transaction approval message and the machine-readable script through the payment network 220 to the POS terminal 204. The POS terminal 204 is configured to store the consumer mobile number associated with the merchant loyalty card with existing customer data in the payment card of the customer by executing the machine-readable script. It shall be noted that the notification may also include a payment transaction decline message indicating that the transaction is declined by the issuer server.

Figure 11:
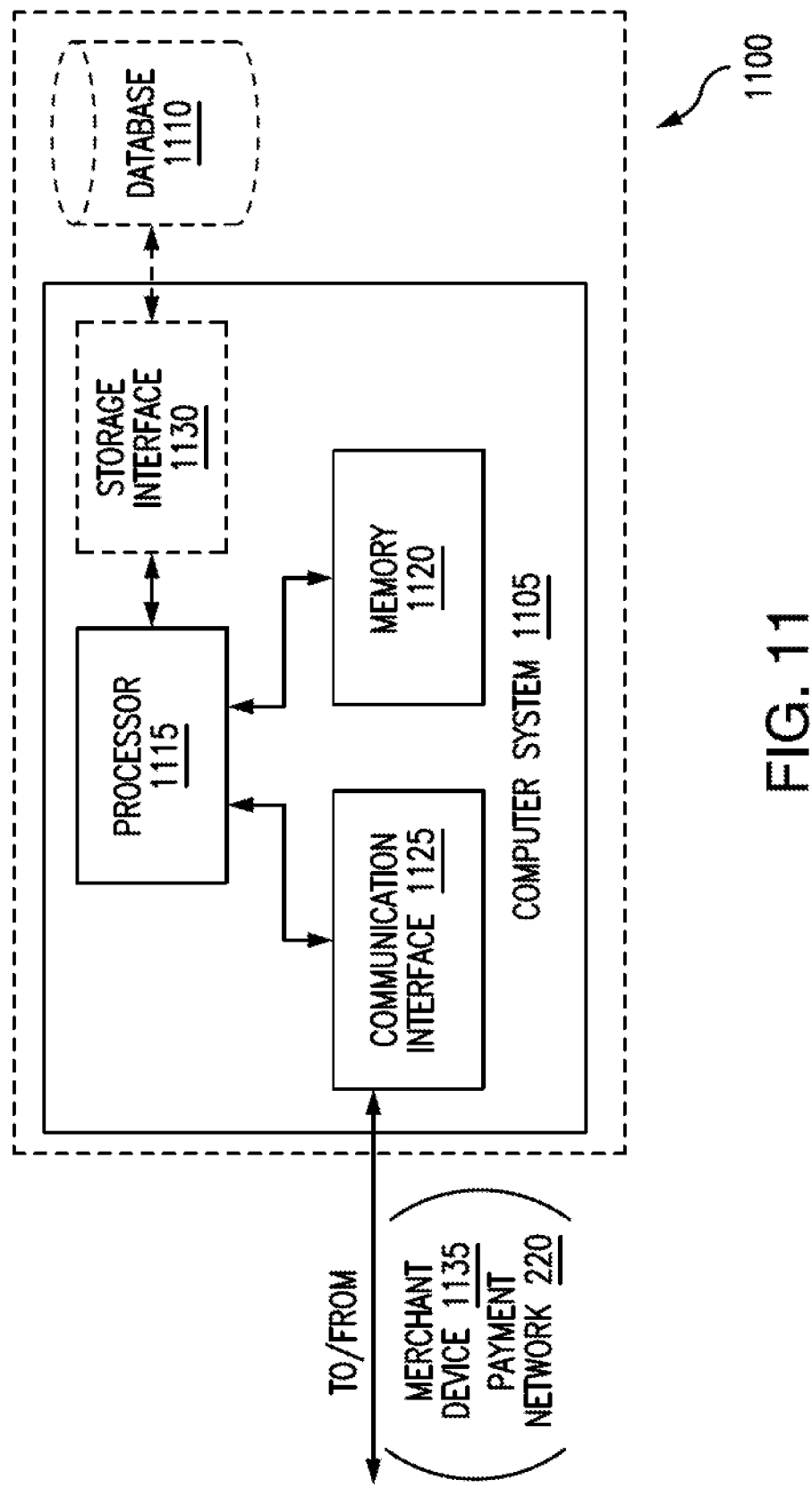
FIG. 11 is a simplified block diagram of the server system used for integrating a loyalty program with a payment card, in accordance with one embodiment of the present disclosure.

FIG. 11 is a simplified block diagram of a server system 1100 used for integrating a loyalty program with a payment card, in accordance with one embodiment of the present disclosure. Examples of the server system 1100 include, but are not limited to, the acquirer server 216, the payment server 218 and the issuer server 214 illustrated in FIG. 2. The server system 1100 includes a computer system 1105 and a database 1110.

The computer system 1105 includes at least one processor 1115 for executing instructions. Instructions may be stored in, for example, but not limited to, a memory 1120. The processor 1115 may include one or more processing units (e.g., in a multi-core configuration).

The processor 1115 is operatively coupled to a communication interface 1125 such that the computer system 1105 is capable of communicating with a remote device such as a merchant device 1135 (e.g., the POS terminal 204 and/or a merchant interface device 203) or communicating with any entity within the payment network 220. For example, the communication interface 1125 may receive the payment transaction request, where the payment transaction request is generated in response to purchase of products by a customer and scanning of the products at a checkout counter by an agent.

The processor 1115 may also be operatively coupled to the database 1110. The database 1110 is any computer-operated hardware suitable for storing and/or retrieving data, such as, but not limited to, transaction data generated as part of sales activities conducted over the bankcard network including data relating to merchants, account holders or customers, and purchases. The database 1110 may also store information related to a plurality of user's issuer accounts. Each user account data includes at least one of a cardholder name, a cardholder address, an account number, MPIN, and other account identifier. The database 1110 may also store information of a plurality of merchants, plurality of loyalty programs offered by the plurality of merchants, plurality of POS terminals installed at merchant facilities, such as POS ID, etc. The database 1110 may also include instructions for settling transactions including merchant bank account information. The database 1110 may include multiple storage units such as hard disks and/or solid-state disks in a redundant array of inexpensive disks (RAID) configuration. The database 1110 may include a storage area network (SAN) and/or a network attached storage (NAS) system.

In some embodiments, the database 1110 is integrated within the computer system 1105. For example, the computer system 1105 may include one or more hard disk drives as the database 1110. In other embodiments, the database 1110 is external to the computer system 1105 and may be accessed by the computer system 1105 using a storage interface 1130. The storage interface 1130 is any component capable of providing the processor 1115 with access to the database 1110. The storage interface 1130 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1115 with access to the database 1110.

The processor 1115 is configured to facilitate a payment transaction from an issuer account to an acquirer account (merchant account). The processor 1115 is configured to one or more of the functions such as: verify the merchant, identify the POS terminal, identify the loyalty program and consumer identifier (such as a consumer mobile number), authenticate the customer 208, verify payment card details, check available standing balance in an issuer account of the customer 208, facilitate generation of the machine-readable script and validate the transaction amount, among others. The processor 1115 is further configured to facilitate the authentication of the customer 208 by verifying the payment card number, PIN/OTP, validity of the payment card by accessing respective information from the database 1110. Thereafter, the processor 1115 is configured to facilitate the payment transaction of the transaction amount from the issuer account of the user to acquirer account of the merchant. The processor 1115 may also be configured to notify the POS terminal 204 and the merchant interface device 203 of the transaction status via the communication interface 1125.

Figure 12:
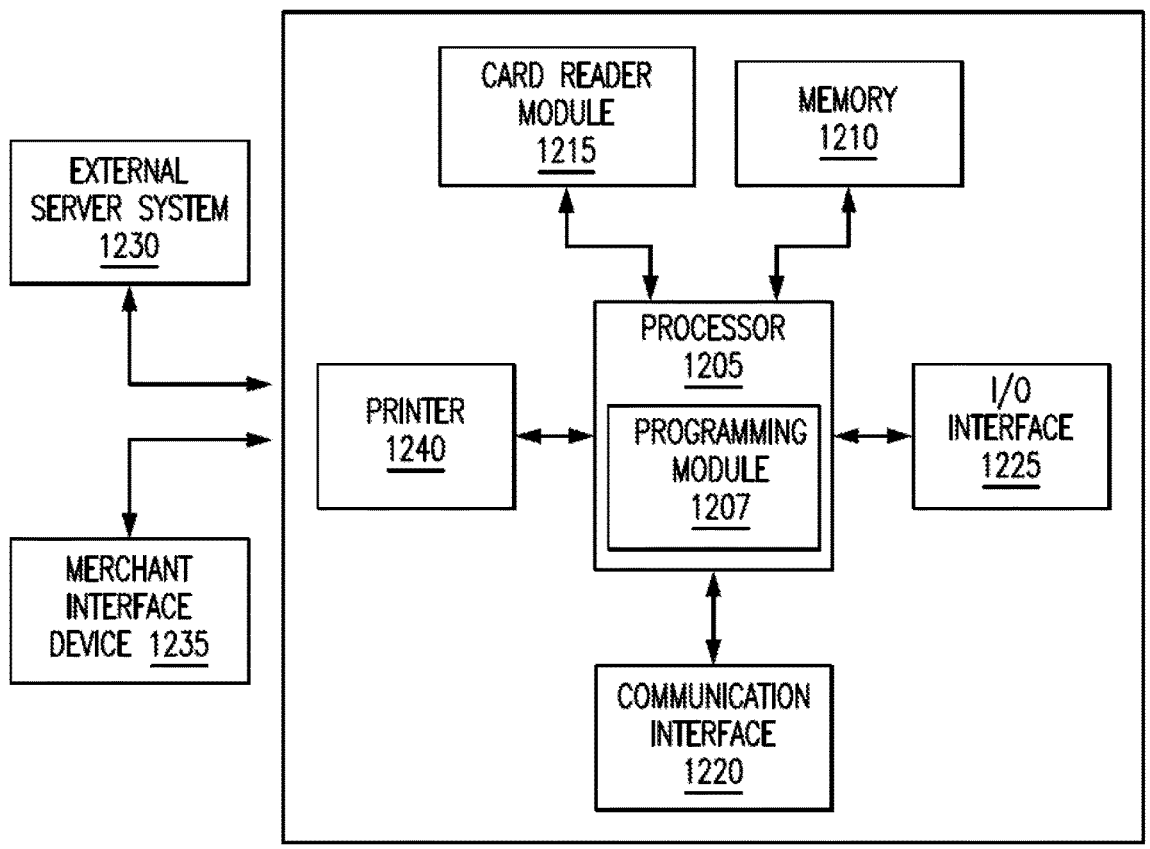
FIG. 12 is a simplified block diagram of a merchant terminal or a POS terminal used for payment transactions and integrating a loyalty program with a payment card, in accordance with one embodiment of the present disclosure.

FIG. 12 is a simplified block diagram of a POS terminal/POS machine 1200 used for payment transactions, in accordance with one embodiment of the present disclosure. The term POS terminal may refer to a system including a host computer connected to several peripheral devices, such as a keyboard, and a mouse, a POS machine (also known as card reader), a barcode scanner, a receipt printer, a cash drawer, and a weighing scale. However, it shall be noted that herein POS terminal is referred to the POS machine which is used to swipe payment cards.

The POS terminal 1200 includes at least one processor 1205 communicably coupled to a memory 1210, a card reader module 1215, a communication interface 1220, an Input/Output (I/O) interface 1225 and a printer 1240. The components of the POS terminal 1200 provided herein may not be exhaustive, and that the POS terminal 1200 may include more or fewer components than that of depicted in FIG. 12. Further, two or more components may be embodied in one single component, and/or one component may be configured using multiple sub-components to achieve the desired functionalities. Some components of the POS terminal 1200 may be configured using hardware elements, software elements, firmware elements and/or a combination thereof.

The card reader module 1215 runs scripts such as or similar to EMV scripts (GET scripts) that allow reading of information from a chip of a payment card. The processor 1205 of the POS terminal 1200 includes a programming module 1207 that is configured to write information onto a chip of a payment card by executing scripts such as or similar to EMV scripts (PUT scripts). The card reader module 1215 is also configured to read information stored within magnetic stripes provided in some payment cards. There may be as many as two card reader modules in the POS terminal 1200 that each of which may be configured to read information stored in different types of storages, such as chips and magnetic stripes.

The I/O interface 1225 is configured to receive inputs from and provide outputs to the end-user (i.e. the merchant and/or the customer) of the POS terminal 1200. For instance, the I/O interface 1225 may include at least one input interface and/or at least one output interface. Examples of the input interface may include, but are not limited to, a keyboard, a keypad, a touch screen, soft keys and the like. The input interface may be used to provide transaction amount, a PIN, a consumer identifier (such as a consumer mobile number or e-mail address of the consumer) and MID. Examples of the output interface may include, but are not limited to, a UI display (such as a light emitting diode display, a thin-film transistor (TFT) display, a liquid crystal display, an active-matrix organic light-emitting diode (AMOLED) display, etc.) and the like. The output interface may be used to display the transaction amount, the consumer mobile number and the MID.

The printer 1240 is configured to print receipts of the transaction. The receipt includes an acquirer bank name, the transaction amount, merchant name, date on which the receipt is printed and a payment card type, among other information.

The memory 1210 can be any type of storage accessible to the processor 1205. For example, the memory 1210 may include volatile or non-volatile memories, or a combination thereof. In some non-limiting examples, the memory 1210 can be four to sixty four Megabytes (MB) of Dynamic Random Access Memory ("DRAM") or Static Random Access Memory ("SRAM"). In addition, some examples may include supplementary flash memory installed via a PCMCIA slot.

The memory 1210 is capable of storing and/or retrieving data, such as, but not limited to, smart card insertions, user/customer information, merchant information, card dips/inserts, touch-screen key depressions, keypad key depressions, number of dots printed by the slip and roll printers, check read errors, and the like. Such information can be accessed by the processor 1205 using the communication interface 1220 to determine potential future failures and the like.

The POS terminal 1200 is capable of communicating with one or more POS peripheral devices such as a merchant interface device 1235 and an external server system 1230 such as an acquirer server (an example of the acquirer server 216 of FIG. 2) via the communication interface 1220 over a communication network (not shown). The merchant interface device 1235 can provide functionality which is used by a consumer at a merchant facility, such as PIN entry, clear text entry, signature capture, and the like. The merchant interface device 1235 may be connected to several peripheral devices including barcode scanners, cash drawers, receipt printers, PIN pads, signature capture devices and the like. In some embodiments, the merchant interface device 1235 may be mounted near a cash register at a check-out counter at a merchant facility, while the POS terminal 1200 may be mounted on the check-out counter such that it is accessible to customers. In this way, both the merchant and the user/customer can interact with similar devices to process the payment transaction.

The communication interface 1220 is further configured to cause display of user interfaces on the POS terminal 1200. In one embodiment, the communication interface 1220 includes a transceiver for wirelessly communicating information (transaction amount, consumer mobile number, MID, etc.) to, or receiving information from, the external server system 1230 or other suitable display device, and/or another type of remote processing device. In another embodiment, the communication interface 1220 is capable of facilitating operative communication with the remote devices and a cloud server using Application Program Interface (API) calls. The communication may be achieved over a communication network.

The processor 1205 is capable of sending the payment transaction request received from the end-user via the communication interface 1220 to the external server system 1230 for processing the payment transaction. For example, the processor 1205 is configured to receive the PIN, the transaction amount, the consumer mobile number and the MID using the UIs.

Additionally, the POS terminal 1200 can include an operating system and various software applications that can provide various functionalities to the POS terminal 1200. For example, in some embodiments, the POS terminal 1200 is addressable with an Internet protocol and includes an application. In such embodiments, the processor 1205 includes software adapted to support such functionality. In some embodiments, the processor 1205 executes software to support network management. In particular, this capacity allows software to be downloaded to a plurality of such systems to provide new applications such as application for various possible payment methods using POS terminals and/or updates to existing applications. The operating system and software application upgrades are distributed and maintained through communication to the POS terminal 1200 over a communication network.

Figure 13:
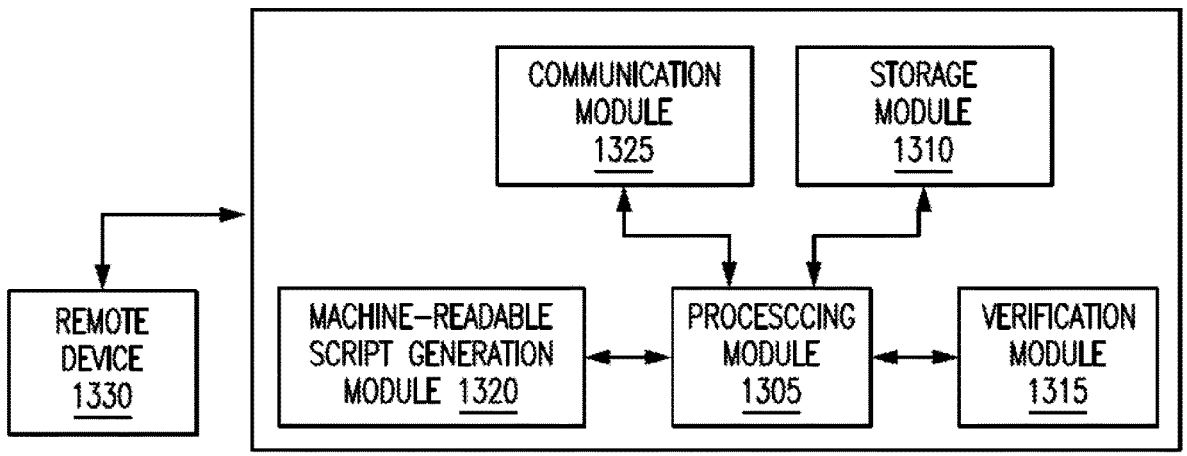
FIG. 13 is a simplified block diagram of an issuer server for integrating a loyalty program with a payment card, in accordance with one embodiment of the present disclosure.

FIG. 13 is a simplified block diagram of an issuer server 1300 used for integrating a loyalty program with a payment card, in accordance with one embodiment of the present disclosure. The issuer server 1300 is an example of the issuer server 214 of FIG. 2, or may be embodied in the issuer server 214. The issuer server 1300 is associated with an issuer bank/issuer, in which a customer may have an account, which provides a payment card. The issuer server 1300 includes a processing module 1305 operatively coupled to a storage module 1310, a verification module 1315, a machine-readable script generation module 1320 and a communication module 1325. The components of the issuer server 1300 provided herein may not be exhaustive and that the issuer server 1300 may include more or fewer components than that of depicted in FIG. 13. Further, two or more components may be embodied in one single component, and/or one component may be configured using multiple sub-components to achieve the desired functionalities. Some components of the issuer server 1300 may be configured using hardware elements, software elements, firmware elements and/or a combination thereof.

The storage module 1310 is configured to store machine executable instructions to be accessed by the processing module 1305. Additionally, the storage module 1310 stores information related to, contact information of the customer, bank account number, availability of funds in the account, payment card details, travel information of customers, and/or the like. This information is retrieved by the processing module 1305 for validation during machine-readable script generation.

The processing module 1305 is configured to communicate with one or more remote devices such as a remote device 1330 using the communication module 1325 over a network such as the payment network 220 of FIG. 2. The examples of the remote device 1330 include the POS terminal 204, the payment server 218, the acquirer server 216, and an external database (not shown) or other computing systems of issuer and the payment network 220 and the like. The communication module 1325 is capable of facilitating such operative communication with the remote devices and cloud servers using API (Application Program Interface) calls. The communication module 1325 is configured to receive payment transaction request from the POS terminal 204 via the payment network 220. The communication module 1325 is configured to send notification of approval or decline of a transaction and the machine-readable script to the POS terminal 204 via the payment network 220.

The processing module 1305 is further configured to provide instructions to the machine-readable script generation module 1320 to generate a machine-readable script. The processing module 1305 receives the transaction amount, the consumer identifier (such as a consumer mobile number), the MID and the PIN from the remote device 1330 (i.e. the POS terminal 204, the payment server 218). The machine-readable script generation module 1320 may verify the authenticity of the consumer mobile number and the MID by accessing a transaction processing table maintained at the payment server 218 or an external database or an issuer database that stores information of various merchants and loyalty programs offered by merchants. Accordingly, using the consumer mobile number and the MID, a machine-readable script is generated, which encodes the consumer mobile number and the MID. The machine-readable script generated at the machine-readable script generation module 1320 is similar to EMV scripts (PUT scripts).

Figure 14:
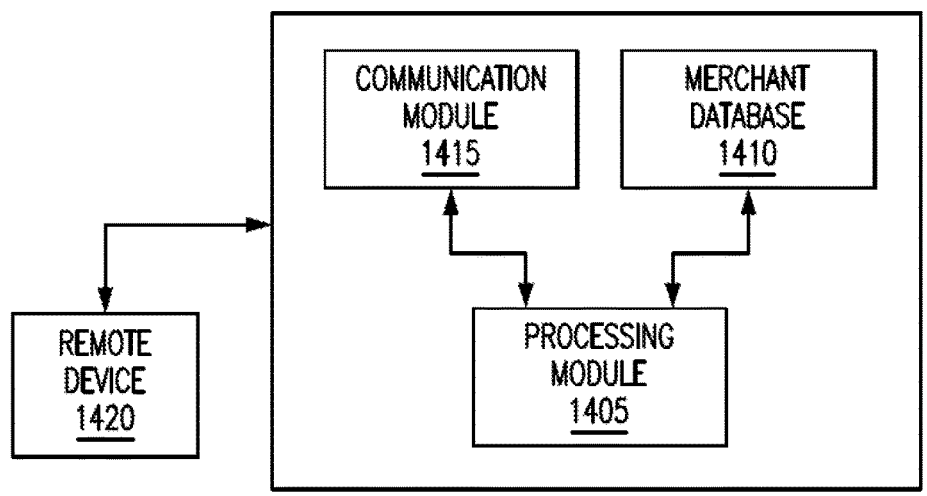
FIG. 14 is a simplified block diagram of an acquirer server used for integrating a loyalty program with a payment card, in accordance with one embodiment of the present disclosure.

FIG. 14 is a simplified block diagram of an acquirer server 1400 used for integrating a loyalty program with a payment card, in accordance with one embodiment of the present disclosure. The acquirer server 1400 is associated with an acquirer bank, which may be associated with a merchant at whose facility the customer 208 is purchasing items. The merchant may have established an account to accept payment for purchase of items from customers. The acquirer server 1400 is an example of the acquirer server 216 of FIG. 2 or may be embodied in the acquirer server 216. Further, the acquirer server 1400 is configured to facilitate payment transaction with the issuer server 1300 using a payment network, such as the payment network 220 of FIG. 2. The acquirer server 1400 includes a processing module 1405 communicably coupled to a merchant database 1410 and a communication module 1415. The components of the acquirer server 1400 provided herein may not be exhaustive, and that the acquirer server 1400 may include more or fewer components than that of depicted in FIG. 14. Further, two or more components may be embodied in one single component, and/or one component may be configured using multiple sub-components to achieve the desired functionalities. Some components of the acquirer server 1400 may be configured using hardware elements, software elements, firmware elements and/or a combination thereof.

The merchant database 1410 includes a table (such as the table 600) which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, loyalty program details, including the consumer identifier (such as the consumer mobile number), loyalty program validity/expiry, loyalty points, loyalty points redemption rules and loyalty points awarding rule, among others. The processing module 1405 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1405 may be configured to store and update the merchant parameters in the merchant database 1410 for later retrieval. In an embodiment, the communication module 1415 is capable of facilitating operative communication with a remote device 1420

Figure 15:
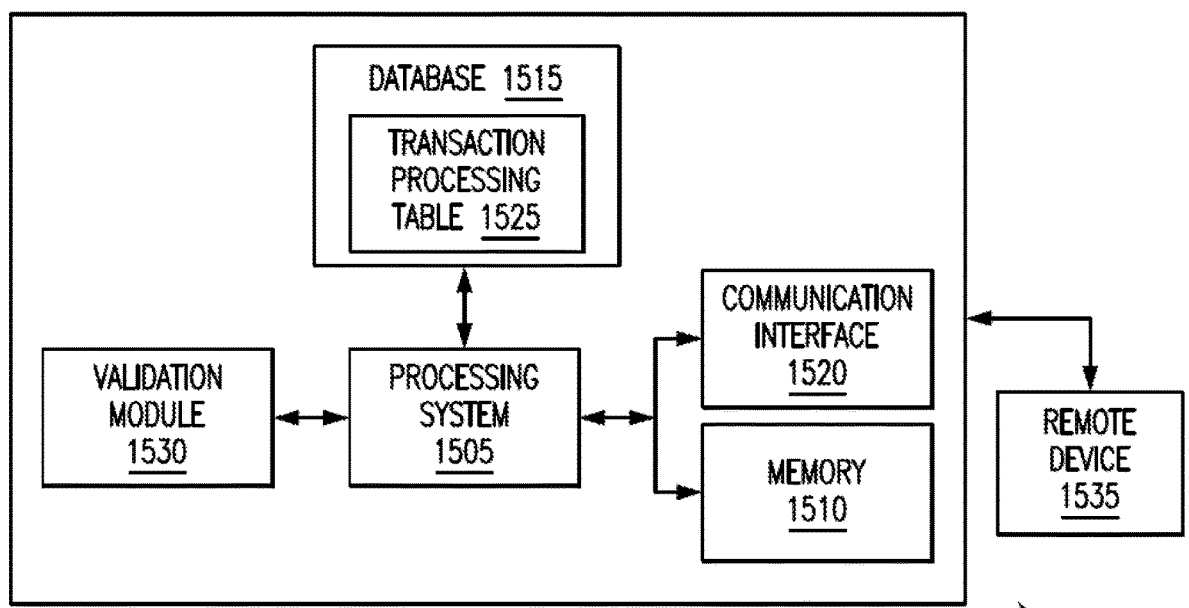
FIG. 15 is a simplified block diagram of a payment server used for integrating a loyalty program with a payment card, in accordance with one embodiment of the present disclosure.

FIG. 15 is a simplified block diagram of a payment server 1500 used for integrating a loyalty program with a payment card, in accordance with one embodiment of the present disclosure. The payment server 1500 may correspond to the payment server 218 of FIG. 2. The payment network 220 may be used by the payment server 1500, the issuer server 1300 and the acquirer server 1400 as a payment interchange network. Examples of payment interchange network include, but not limited to, Mastercard® payment system interchange network. The payment server 1500 includes a processing system 1505 configured to extract programming instructions from a memory 1510 to provide various features of the present disclosure. The components of the payment server 1500 provided herein may not be exhaustive and that the payment server 1500 may include more or fewer components than that of depicted in FIG. 15. Further, two or more components may be embodied in one single component, and/or one component may be configured using multiple sub-components to achieve the desired functionalities. Some components of the payment server 1500 may be configured using hardware elements, software elements, firmware elements and/or a combination thereof.

Via a communication interface 1520, the processing system 1505 receives the payment transaction request from a remote device 1535 such as the acquirer server 1400 or the POS terminal 1200. The communication may be achieved through API calls, without loss of generality. A transaction processing table 1525 is embodied in a database 1515. The transaction processing table 1525 stores details such as Issuer ID, POS ID, country code, acquirer ID, consumer identifier and MID, among others. Upon receiving the payment transaction request from the acquirer server 1400, the payment server 1500 may perform a lookup into the transaction processing table 1525 to identify the authenticity of the POS terminal, the consumer identifier and the MID. The transaction processing table 1525 also stores the customer parameters and payment card details, acquirer account information, transaction records, merchant account information, and the like.

The customer details, the payment card details etc., are validated using a validation module 1530. The validation module 1530 may include one or more predefined rule sets using which the processing system 1505 can process the validation. Further, the processing system 1505, upon successful validation, sends transaction amount and the merchant parameters to the acquirer server 1400 for crediting the merchant account with the transaction amount. The processing system 1505 is further configured to notify the remote device 1535 of the transaction status via the communication interface 1520. In one embodiment, the processing system 1505 may facilitate a dedicated application capable of being installed on the merchant interface device 203. The merchant may be enabled to view the transaction status using the application on the merchant interface device 203. The merchant may access the application using a web link as well, instead of having a need to install the application on the merchant interface device 203.

Figure 16:
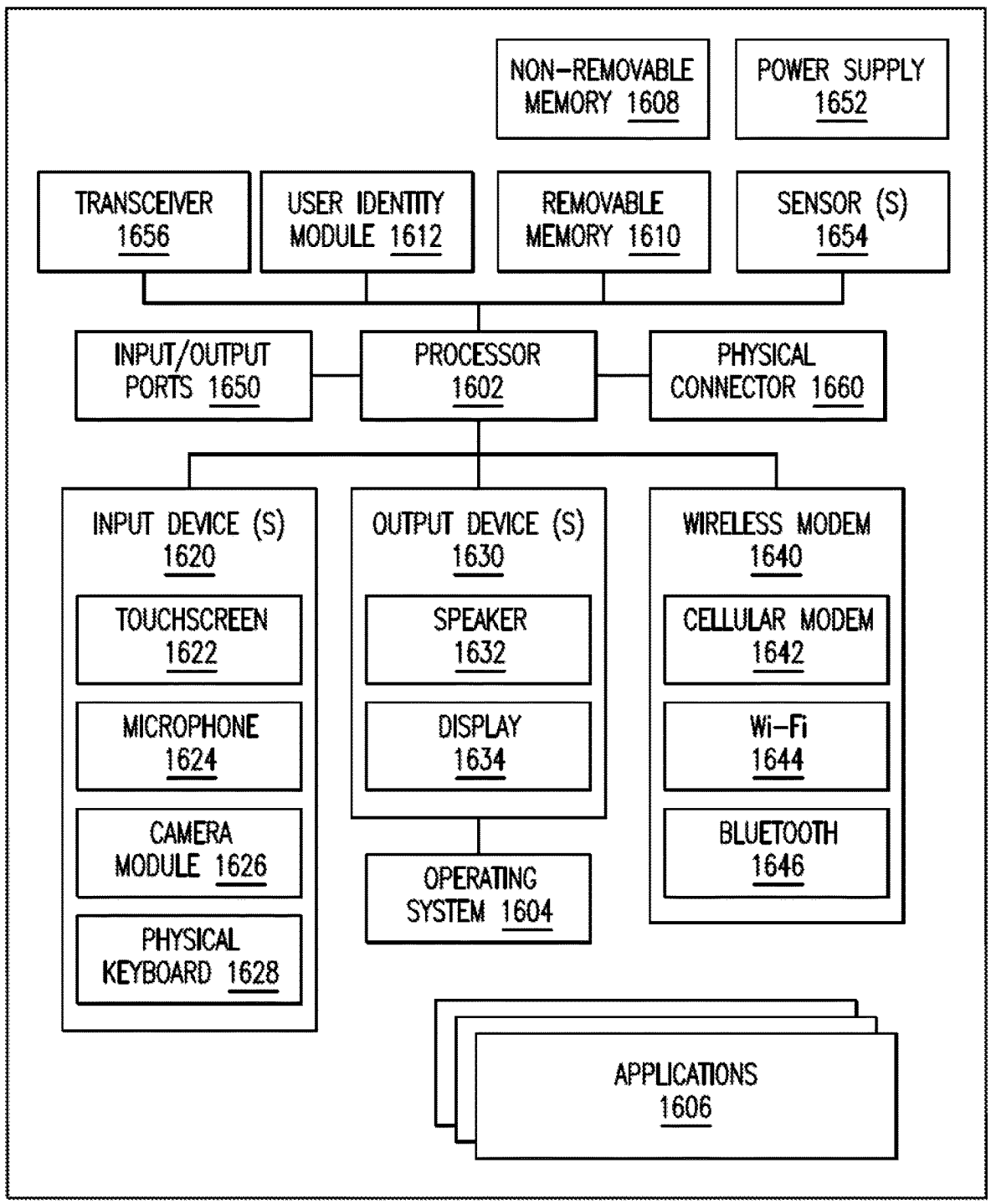
FIG. 16 shows simplified block diagram of a user device, for example, a mobile phone capable of implementing at least some embodiments of the present disclosure.

FIG. 16 shows simplified block diagram of a merchant device 1600 or a merchant interface device (such as the merchant interface device 203) for example, a desktop computer or a mobile phone capable of implementing the various embodiments of the present disclosure. The merchant device 1600 is depicted to include one or more applications 1606. The merchant device 1600 is an example of the merchant interface device 203.

It should be understood that the merchant device 1600 as illustrated and hereinafter described is merely illustrative of one type of device and should not be taken to limit the scope of the embodiments. As such, it should be appreciated that at least some of the components described below in connection with that the merchant device 1600 may be optional and thus in an example embodiment may include more, less or different components than those described in connection with the example embodiment of the FIG. 16. As such, among other examples, the merchant device 1600 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated merchant device 1600 includes a controller or a processor 1602 (e.g., a signal processor, microprocessor, ASIC, or other control and processing logic circuitry) for performing such tasks as signal coding, data processing, image processing, input/output processing, power control, and/or other functions. An operating system 1604 controls the allocation and usage of the components of the merchant device 1600 and support for the one or more applications programs (see, the travel booking applications 1606), that implements one or more of the innovative features described herein. The applications 1606 may include common mobile computing applications (e.g., telephony applications, email applications, calendars, contact managers, web browsers, messaging applications such as USSD messaging or SMS messaging or SIM Tool Kit (STK) application) or any other computing application.

The illustrated merchant device 1600 includes one or more memory components, for example, anon-removable memory 1608 and/or a removable memory 1610. The non-removable memory 1608 and/or the removable memory 1610 may be collectively known as database in an embodiment. The non-removable memory 1608 can include RAM, ROM, flash memory, a hard disk, or other well-known memory storage technologies. The removable memory 1610 can include flash memory, smart cards, or a Subscriber Identity Module (SIM). The one or more memory components can be used for storing data and/or code for running the operating system 1604 and the applications 1606. The merchant device 1600 may further include a user identity module (UIM) 1612. The UIM 1612 may be a memory device having a processor built in. The UIM 1612 may include, for example, a subscriber identity module (SIM), a universal integrated circuit card (UICC), a universal subscriber identity module (USIM), a removable user identity module (R-UIM), or any other smart card. The UIM 1612 typically stores information elements related to a mobile subscriber. The UIM 1612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The merchant device 1600 can support one or more input devices 1620 and one or more output devices 1630. Examples of the input devices 1620 may include, but are not limited to, a touch screen/a display screen 1622 (e.g., capable of capturing finger tap inputs, finger gesture inputs, multi-finger tap inputs, multi-finger gesture inputs, or keystroke inputs from a virtual keyboard or keypad), a microphone 1624 (e.g., capable of capturing voice input), a camera module 1626 (e.g., capable of capturing still picture images and/or video images) and a physical keyboard 1628. Examples of the output devices 1630 may include, but are not limited to a speaker 1632 and a display 1634. Other possible output devices can include piezoelectric or other haptic output devices. Some devices can serve more than one input/output function. For example, the touch screen 1622 and the display 1634 can be combined into a single input/output device.

A wireless modem 1640 can be coupled to one or more antennas (not shown in the FIG. 16) and can support two-way communications between the processor 1602 and external devices, as is well understood in the art. The wireless modem 1640 is shown generically and can include, for example, a cellular modem 1642 for communicating at long range with the mobile communication network, a Wi-Fi compatible modem 1644 for communicating at short range with an external Bluetooth-equipped device or a local wireless data network or router, and/or a Bluetooth-compatible modem 1646. The wireless modem 1640 is typically configured for communication with one or more cellular networks, such as a GSM network for data and voice communications within a single cellular network, between cellular networks, or between the merchant device 1600 and a public switched telephone network (PSTN).

The merchant device 1600 can further include one or more input/output ports 1650 for establishing connection with peripheral devices including the POS terminal 1200, a power supply 1652, one or more sensors 1654 for example, an accelerometer, a gyroscope, a compass, or an infrared proximity sensor for detecting the orientation or motion of the merchant device 1600 and biometric sensors for scanning biometric identity of an authorized user, a transceiver 1656 (for wirelessly transmitting analog or digital signals) and/or a physical connector 1660, which can be a USB port, IEEE 1294 (FireWire) port, and/or RS-232 port. The illustrated components are not required or all-inclusive, as any of the components shown can be deleted and other components can be added.

The disclosed methods with reference to FIGS. 1 to 8, or one or more operations of the flow diagram 900 and 1000 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1100 (e.g. servers 214, 216 and 218) and its various components such as the computer system 1105 and the database 1110 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method of integrating a loyalty program associated with a merchant loyalty card of a customer with a chip enabled payment card of the customer, the method comprising:

sending, by a processor of a merchant terminal via a communication interface during a payment transaction between a merchant and a customer, a payment transaction request to an issuer server, the payment transaction request comprising a payment transaction amount to be paid to a merchant account from an issuer account of the customer, a merchant identifier (MID) of the loyalty program associated with a merchant loyalty card and a consumer identifier linked to the loyalty program associated with the merchant loyalty card;

receiving, by the processor of the merchant terminal via the communication interface from the issuer server, a notification comprising one of a payment transaction approval message or a decline message and a machine-readable script generated by the issuer server, the machine-readable script encoding the consumer identifier linked to the loyalty program and the MID;

executing, by the processor of the merchant terminal, the machine-readable script; and writing, by a programming module of the processor of the merchant terminal, the consumer identifier and the MID onto the chip enabled payment card of the customer thereby integrating the loyalty program with the chip enabled payment card.

2. The method as claimed in claim 1, further comprising:
  detecting, by the processor of the merchant terminal, the loyalty program integrated with the chip enabled payment card of the customer; and
  upon detection of the loyalty program integrated with the chip enabled payment card, awarding, by the processor of the merchant terminal, loyalty points to the loyalty program integrated with the chip enabled payment card based on one or more pre-defined rules for awarding the loyalty points, the loyalty points awarded upon receiving the notification comprising the payment transaction approval message from the server system.

3. The method as claimed in claim 2, wherein awarding the loyalty points further comprises, awarding the loyalty points based on payment transactions performed by the customer with a merchant offering the merchant loyalty card or one or more partner merchants of the merchant.

4. The method as claimed in claim 3, wherein awarding the loyalty points further comprises, facilitating redemption of the loyalty points by the customer when the customer uses the chip enabled payment card in making future payment transactions with the merchant offering the merchant loyalty card or with the one or more partner merchants.

5. The method as claimed in claim 1, further comprising:
  sending, by the processor of the merchant terminal via the communication interface, a loyalty program deactivation request to the server system through the payment network, the loyalty program deactivation request comprising the consumer identifier linked to an existing loyalty program integrated with the chip enabled payment card of the customer;
  receiving, via the communication interface by the processor of the merchant terminal, a deactivation script generated at the server system, the deactivation script comprising instructions for erasing the consumer identifier stored in the chip enabled payment card; and
  executing, by the processor of the merchant terminal, the deactivation script resulting in deleting the existing loyalty program from the chip enabled payment card of the customer.

6. The method as claimed in claim 1, further comprising:
  sending, by the processor of the merchant terminal via the communication interface, a loyalty program modification request to the server system through the payment network, the loyalty program modification request comprising the consumer identifier linked to an existing loyalty program integrated with the chip enabled payment card of the customer;
  receiving, by the processor of the merchant terminal via the communication interface, a modification script generated at the server system, the modification script comprising instructions for modifying the existing loyalty program integrated with the chip enabled payment card; and
  executing, by the processor of the merchant terminal, the modification script; and
  writing, by the programming module of the processor of the merchant terminal, a modified loyalty program onto the chip enabled payment card resulting in updating the existing loyalty program with a modified loyalty program.

7. A merchant terminal for integrating a loyalty program associated with a merchant loyalty card of a customer with a chip enabled payment card of the customer, the merchant terminal comprising:
  a card reader module;
  an input/output (IO) interface;
  a communication interface;
  a memory comprising stored instructions; and
  at least one processor comprising a programming module, the at least one processor operably connected to the card reader module, the I/O interface, the communication interface and the memory and configured to execute the stored instructions to cause the merchant terminal to:
    send, via the communication interface during a payment transaction between a merchant and a customer, a payment transaction request to an issuer server, the payment transaction request comprising a payment transaction amount to be paid to a merchant account from an issuer account of the customer, a merchant identifier (MID) of the loyalty program associated with a merchant loyalty card and a consumer identifier linked to the loyalty program associated with the merchant loyalty card;
    receive via the communication interface a notification from the issuer server, the notification comprising one of a payment transaction approval message or a decline message and a machine-readable script generated by the issuer server, the machine-readable script encoding the consumer identifier linked to the loyalty program and the MID;
    execute the machine-readable script; and
    writing by utilizing the programming module the consumer identifier and the MID onto the chip enabled payment card of the customer thereby integrating the loyalty program with the chip enabled payment card.

8. The merchant terminal as claimed in claim 7, wherein the merchant terminal is a point of sale (POS) terminal connected to a merchant interface device and a merchant database.

9. The merchant terminal as claimed in claim 7, wherein the merchant terminal is further caused to:
  detect the loyalty program integrated with chip enabled the payment card of the customer; and
  upon detection of the loyalty program integrated with the chip enabled payment card, award loyalty points to the loyalty program integrated with the chip enabled payment card based on pre-defined criteria for awarding the loyalty points, the loyalty points awarded upon receiving the notification comprising the payment transaction approval message from the server system.

10. The merchant terminal as claimed in claim 9, wherein for awarding the loyalty points to the loyalty program integrated with the chip enabled payment card, the merchant terminal is caused to award the loyalty points based on payment transactions performed by the customer with a merchant offering the merchant loyalty card and one or more partner merchants.

11. The merchant terminal as claimed in claim 10, wherein the merchant terminal is further caused to facilitate redemption of the loyalty points by the customer when the customer uses the chip enabled payment card in making future transactions with the merchant offering the merchant loyalty card or with the one or more partner merchants.

12. A method for integrating a loyalty program associated with a merchant loyalty card of a customer with a chip enabled payment card of the customer, the method comprising:
  receiving, by a processor module of an issuer server via a communication module from a payment server, a payment transaction request comprising a payment transaction amount to be paid to a merchant account from an issuer account of the customer, a merchant identifier (MID) of the loyalty program associated with a merchant loyalty card and a consumer identifier linked to the loyalty program associated with the merchant loyalty card;

verifying, by a verification module operably connected to the processor module of the issuer server, the authenticity of the consumer identifier linked to the loyalty program and the MID;

generating, by a machine-readable script generation module operably connected to the processor module of the issuer server, a machine-readable script comprising instructions encoding the consumer identifier linked to the loyalty program and the MID, the machine-readable script executable at a merchant terminal;

sending, by the processor module via a communication module of the issuer server, a notification comprising one of a payment transaction approval message or a decline message and the machine-readable script to the merchant terminal;

executing, by the merchant terminal, the machine-readable script; and writing, by the merchant terminal, the consumer identifier and the MID onto the payment card of the customer thereby integrating the loyalty program with the chip enabled payment card.

13. The method as claimed in claim 12, wherein generating the machine-readable script further comprises generating, by the issuer server, the machine-readable script upon identification of an association of the merchant and the loyalty program using the merchant identifier and the consumer identifier linked to the loyalty program.

14. The method as claimed in claim 12, further comprising sending, by the issuer server, a deactivation script executable at the merchant terminal to deactivate an existing loyalty program integrated with the chip enabled payment card upon receiving a deactivation request from the merchant terminal through the payment network.

15. The method as claimed in claim 12, further comprising sending, by the issuer server, a modification script executable at the merchant terminal to modify an existing loyalty program integrated with the chip enabled payment card upon receiving a modification request from the merchant terminal through the payment network.

16. The method as claimed in claim 12, wherein sending the notification further comprises sending, by the issuer server, the notification through the payment network to the merchant terminal which sends the payment transaction request among a plurality of merchant terminals connected to the payment network and facilitating execution of the machine-readable script by the merchant terminal which sends the payment transaction request.

* * * * *